(12) United States Patent
Takashima et al.

(10) Patent No.: US 7,885,512 B2
(45) Date of Patent: Feb. 8, 2011

(54) INFORMATION PROCESSING APPARATUS, INFORMATION PROCESSING METHOD, INFORMATION RECORDING MEDIUM, AND COMPUTER PROGRAM

(75) Inventors: Yoshikazu Takashima, Tokyo (JP); Kenjiro Ueda, Kanagawa (JP); Tateo Oishi, Saitama (JP); Motoki Kato, Kanagawa (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 1236 days.

(21) Appl. No.: 11/490,260

(22) Filed: Jul. 21, 2006

(65) Prior Publication Data
US 2007/0025694 A1     Feb. 1, 2007

(30) Foreign Application Priority Data
Aug. 1, 2005     (JP)     ............................. 2005-223458

(51) Int. Cl.
*H04N 7/26* (2006.01)
(52) U.S. Cl. ...................................... 386/125; 386/124
(58) Field of Classification Search ................. 386/125, 386/124, 45, 46, 52, 92
See application file for complete search history.

(56) References Cited

U.S. PATENT DOCUMENTS 5,506,825 A * 4/1996 Gushima et al. .............. 386/96

2007/0078866 A1 * 4/2007 Takashima .................. 707/100

FOREIGN PATENT DOCUMENTS

| JP | 2004-532495 | 10/2004 |
|---|---|---|
| JP | 2006-332913 | 12/2006 |
| WO | WO 02/079906 A2 | 10/2002 |
| WO | WO 2005/008385 A2 | 1/2005 |

* cited by examiner

*Primary Examiner*—Robert Chevalier
(74) *Attorney, Agent, or Firm*—Oblon, Spivak, McClelland, Maier & Neustadt, L.L.P.

(57) ABSTRACT

An information processing apparatus plays back content including a plurality of divided playback zones, a playlist being associated with each of the divided playback zones. The information processing apparatus includes a playlist selection information obtaining unit obtaining a plurality of pieces of playlist selection information including information concerning a playback sequence of play items which are set as content playback unit data, the plurality of pieces of playlist selection information being obtained in accordance with the number of playback zones included in the content, a playlist selector selecting a plurality of playlists on the basis of the plurality of pieces of playlist selection information obtained by the playlist selection information obtaining unit, a playlist integrating processor generating an integrated playlist by integrating the plurality of playlists selected by the playlist selector, and a content playback unit playing back the content on the basis of the integrated playlist.

22 Claims, 22 Drawing Sheets

FIG. 6

COLUMN (:c) = (SEQUENCE NO.)

| | 253 | 254 | 255 |
|---|---|---|---|
| 0 | 0 | 0 | 0 |
| 1 | 1 | 1 | 1 |
| 2 | 2 | 2 | 2 |
| .. | 95 | 41 | 222 |
| 253 | 253 | 253 | 253 |
| 254 | 254 | 254 | 254 |
| 255 | 255 | 255 | 255 |

⋮

| 0 | 1 | 2 |
|---|---|---|
| 0 | 0 | 0 |
| 1 | 1 | 1 |
| 2 | 2 | 2 |
| .. | .. | .. |
| | 21 | 128 |
| 253 | 253 | 253 |
| 254 | 254 | 254 |
| 255 | 255 | 255 |

ROW (:r) →

| SEQUENCE NO. = COLUMN NO. | SEQUENCE KEY $Sk(c, r)$ |
|---|---|
| 0 | $Sk(0, 1)$ |
| 1 | $Sk(1, 21)$ |
| 2 | $Sk(2, 128)$ |
| 3 | $Sk(3, 34)$ |
| .. | .. |
| i | $Sk(i, xy)$ |
| .. | .. |
| 255 | $Sk(255, 222)$ |

$Sk$ (COLUMN) NUMBER, ROW NUMBER

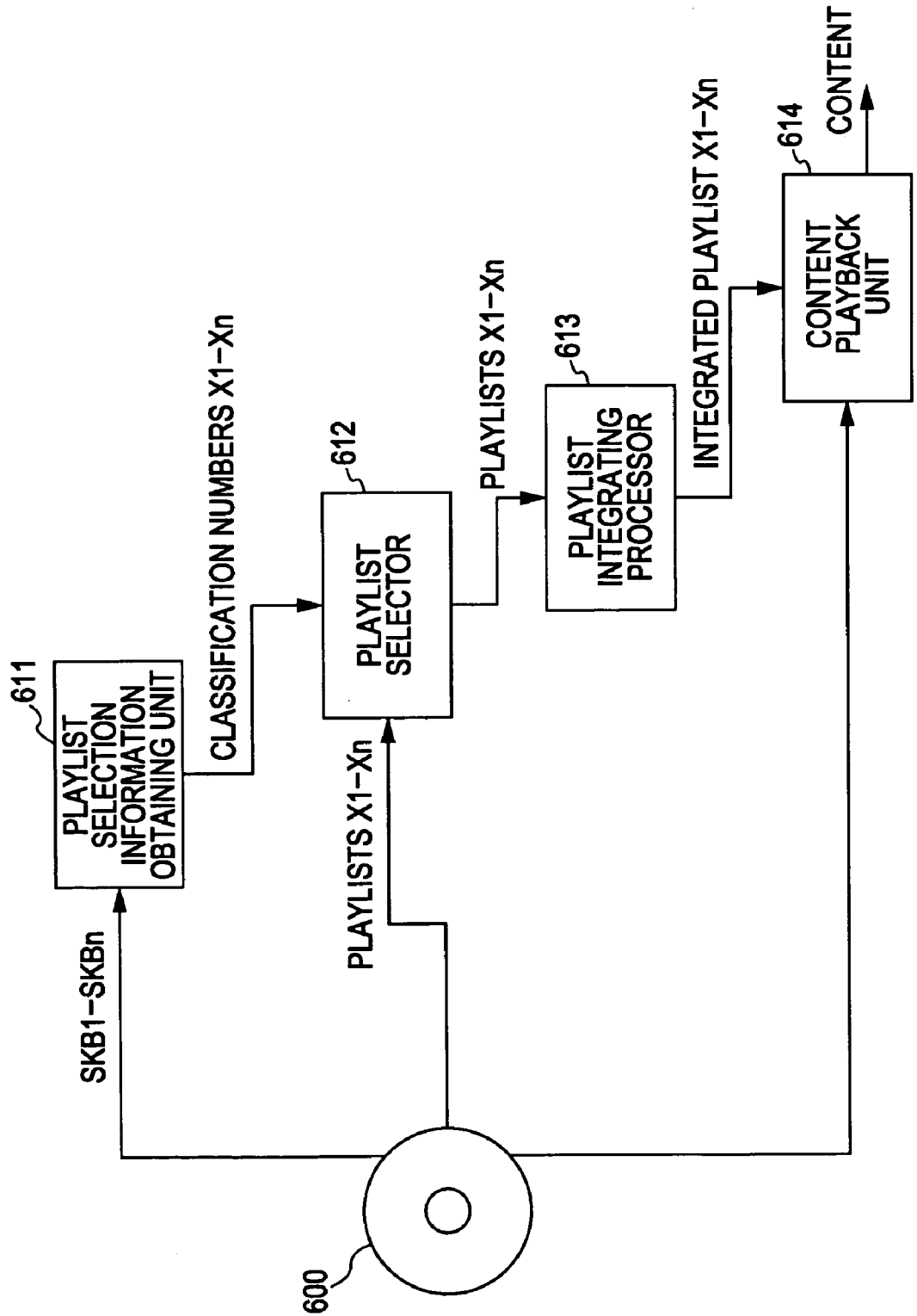

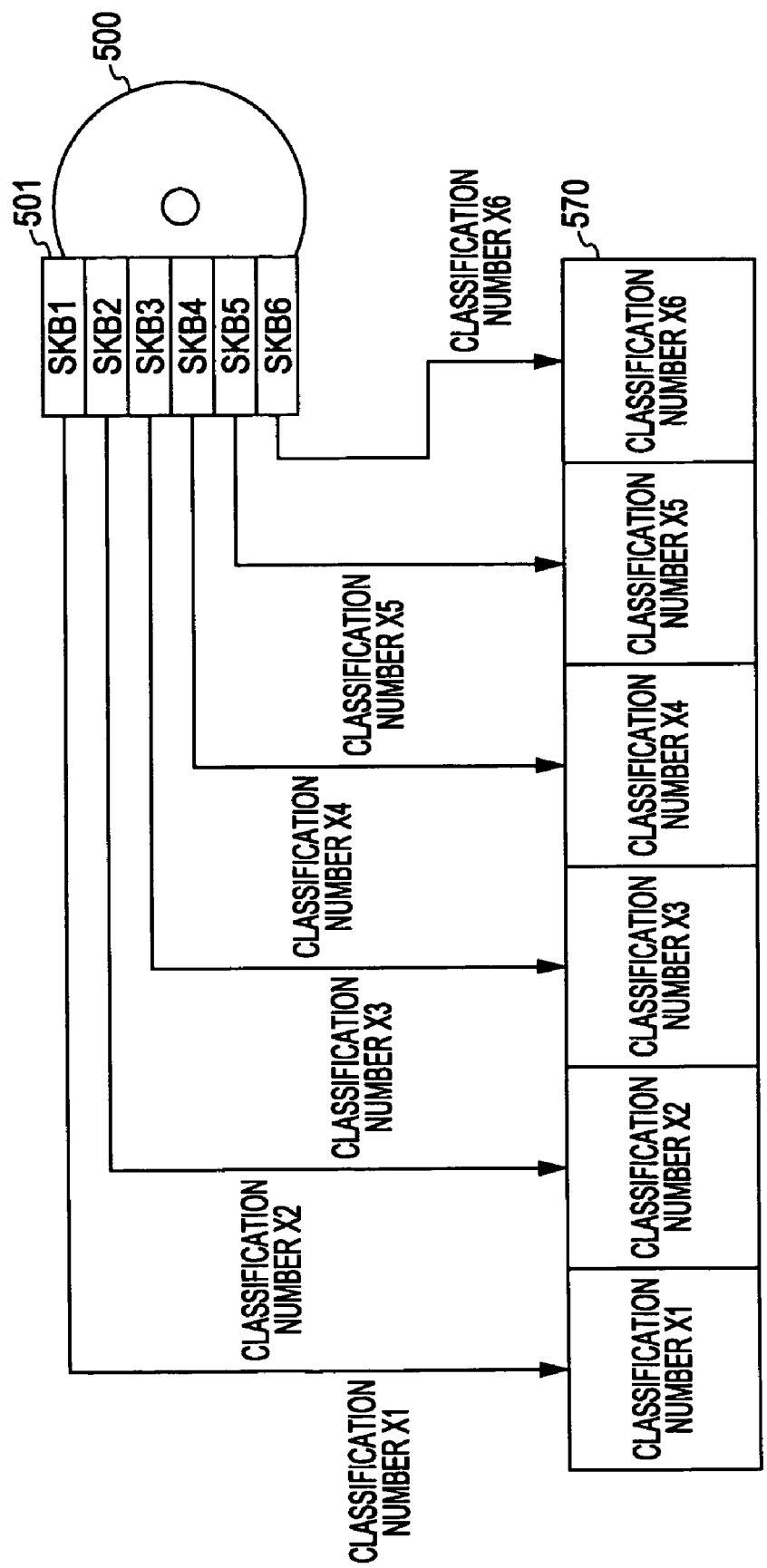

FIG. 19A

```
MovieObject(){
    number_of_navigation_commands (=12)
    Register = PSR_A(VariantNo1);
    Register = 256 + PSR_B(VariantNo2);
    Register = 256 * 2 + PSR_C(VariantNo3);
    Register = 256 * 3 + PSR_D(VariantNo4);
    Register = 256 * 4 + PSR_E(VariantNo5);
    Register = 256 * 5 + PSR_F(VariantNo6);
    PlayPL(PlayList id = Register);
    PlayPL(PlayList id = Register);
    PlayPL(PlayList id = Register);
    PlayPL(PlayList id = Register);
    PlayPL(PlayList id = Register);
    PlayPL(PlayList id = Register);
}
```

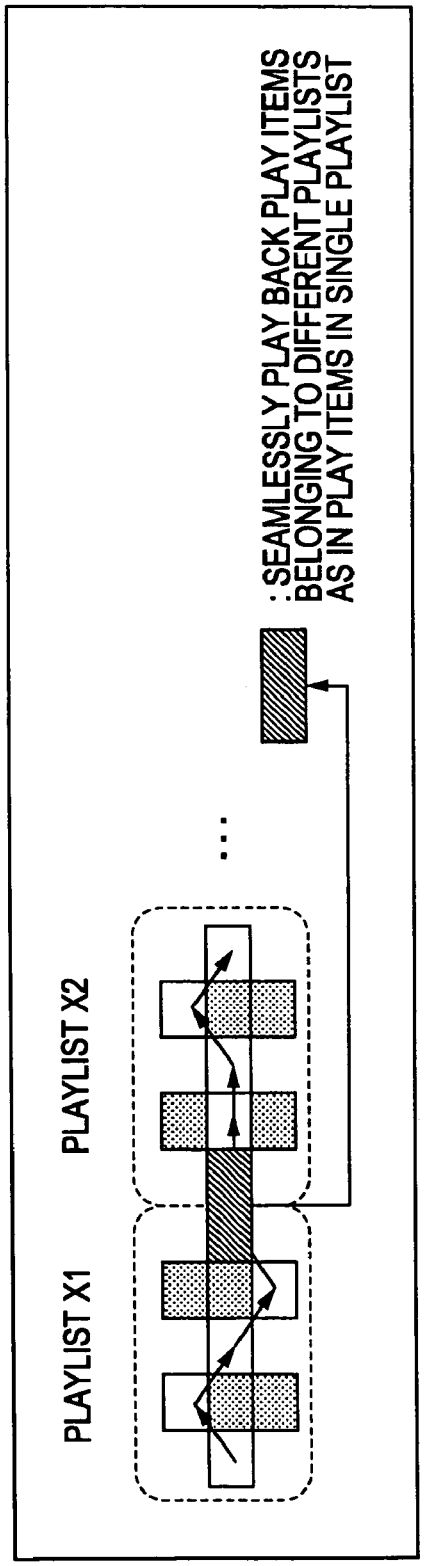

FIG. 19B

INFORMATION PROCESSING APPARATUS, INFORMATION PROCESSING METHOD, INFORMATION RECORDING MEDIUM, AND COMPUTER PROGRAM

CROSS REFERENCES TO RELATED APPLICATIONS

The present invention contains subject matter related to Japanese Patent Application JP 2005-223458 filed in the Japanese Patent Office on Aug. 1, 2005, the entire contents of which are incorporated herein by reference.

BACKGROUND OF THE INVENTION

1. Field of the Invention

The present invention relates to information processing apparatuses, information processing methods, information recording media, and computer programs. More particularly, the invention relates to an information processing apparatus, an information processing method, an information recording medium, and a computer program in which a playback path is defined in accordance with the information processing apparatus so that content having a playlist selected for each playback zone can be seamlessly played back.

2. Description of the Related Art

Various software data (hereinafter referred to as "content"), such as audio data, e.g., music, image data, e.g., movies, game programs, and various application programs, can be stored on recording media, for example, Blu-ray discs (trademark) using blue laser light, digital versatile discs (DVDs), mini discs (MDs), compact discs (CDs), as digital data. In particular, Blu-ray discs (trademark) using blue laser light are high-density recording discs and can record a large volume of video content as high-quality image data.

Digital content is stored in various information recording media, such as those described above, and is provided to users. A user uses the digital content by playing it back on the user's personal computer (PC) or a player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", and the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data, such as, video data or sound data, encrypted and recorded on, for example, a DVD read only memory (DVD-ROM), can be descrambled for playing back the content.

In descramble processing, it is necessary to execute processing using specific data, such as a key, provided for licensed DVD players. A license is given to DVD players that are designed in compliance with predetermined operation rules, for example, agreeing not to perform unauthorized copying. Accordingly, licensed DVD players can descramble data recorded on a DVD-ROM by using specific data, for example, a given key, to play back images or sound from the DVD-ROM.

On the other hand, an unlicensed DVD player cannot play back data recorded on the DVD-ROM since it does not have a key for descrambling the scrambled data. In this manner, in the content scrambling system, DVD players that do not satisfy conditions demanded for receiving a license cannot play back digital data from the DVD-ROM, thereby preventing unauthorized copying.

However, such a content scrambling system is not a perfect system, and there are many content scrambling systems whose descrambling methods have already been deciphered and are distributed via communication means, such as the Internet. In this manner, once scrambling methods are deciphered, content is illegally played back or copied by unauthorized descramble processing, and the copyright or the right to use content is violated.

As another technique for preventing the unauthorized use of content, the published Japanese translations of PCT international publication for patent application No. 2004-532495 discloses a configuration in which video data having different content variations are set and one piece of video data having a specific content variation is selected. According to this configuration, however, content can be played back in many devices due to leakage of a cryptographic key, in which case, it is difficult to specify the source of leakage.

SUMMARY OF THE INVENTION

It is thus desirable to provide an information processing apparatus, an information processing method, an information recording medium, and a computer program in which the unauthorized use of content is eliminated to implement strict content usage management, and a playback path is defined in accordance with the information processing apparatus so that content having a playlist selected for each playback zone can be played back.

More particularly, it is desirable to provide an information processing apparatus, an information processing method, an information recording medium, and a computer program in which a segment, which serves as a content recording unit of the information recording medium, is formed of a plurality of variations using different cryptographic keys, and only a specific playback path, which is set by selecting specific variations, can be decrypted when performing playback processing by the information processing apparatus, and also, content can be seamlessly played back by setting a plurality of different sequence key blocks (SKB) storing key generation information necessary for decrypting the specific playback path and by using a plurality of playlists selected in accordance with the plurality of SKBs.

According to an embodiment of the present invention, there is provided an information processing apparatus that plays back content including a plurality of divided playback zones, a playlist being associated with each of the divided playback zones. The information processing apparatus includes a playlist selection information obtaining unit configured to obtain a plurality of pieces of playlist selection information including information concerning a playback sequence of play items which are set as content playback unit data, the plurality of pieces of playlist selection information being obtained in accordance with the number of playback zones included in the content, a playlist selector configured to select a plurality of playlists on the basis of the plurality of pieces of playlist selection information obtained by the playlist selection information obtaining unit, a playlist integrating processor configured to generate an integrated playlist by integrating the plurality of playlists selected by the playlist selector, and a content playback unit configured to play back the content on the basis of the integrated playlist.

The content may be recorded on an information recording medium and may include segments portions, each having a plurality of variation data generated by encrypting an identical playback data portion with different cryptographic keys. The playlist selection information obtaining unit may select, in accordance with each of the content playback zones, playlist selection information corresponding to a playlist including a play item sequence that is defined by a playback path having variation data selected from each segment portion, the playback path being selected in accordance with the information processing apparatus.

The playlist selection information obtaining unit may process a plurality of sequence key blocks, each storing the playlist selection information corresponding to each of the playback zones, by executing data processing on the basis of a cryptographic key stored in the information processing apparatus, thereby obtaining the playlist selection information from each of the plurality of sequence key blocks. It is not necessary that the sequence key blocks physically store playlist selection information. In this specification, for example, when playlist selection information is obtained as a result of computation processing on the basis of the sequence key blocks, it can be considered that the sequence key blocks store playlist selection information.

The playlist integrating processor may generate the integrated playlist in which the information concerning the playback sequences of the play items included in the plurality of playlists is set as one play item sequence.

The content playback unit may play back the content by using a virtual file system that is accessible from the integrated playlist generated by the playlist integrating processor and by obtaining the play items specified in the integrated playlist.

According to another embodiment of the present invention, there is provided an information processing apparatus that plays back content including a plurality of divided playback zones, a playlist being associated with each of the divided playback zones. The information processing apparatus includes a playlist selection information obtaining unit configured to obtain a plurality of pieces of playlist selection information including information concerning a playback sequence of play items which are set as content playback unit data, the plurality of pieces of playlist selection information being obtained in accordance with the number of playback zones included in the content, a register configured to store the plurality of pieces of playlist selection information obtained by the playlist selection information obtaining unit, a playlist selector configured to sequentially obtain the plurality of pieces of playlist selection information stored in the register and to select playlists on the basis of the plurality of pieces of playlist selection information, and a content playback unit configured to play back the content on the basis of the playlists selected by the playlist selector.

The content may be recorded on an information recording medium and may include segments portions, each having a plurality of variation data generated by encrypting an identical playback data portion with different cryptographic keys. The playlist selection information obtaining unit may select, in accordance with each of the content playback zones, playlist selection information corresponding to a playlist including a play item sequence that is defined by a playback path having variation data selected from each segment portion, the playback path being selected in accordance with the information processing apparatus.

The playlist selection information obtaining unit may process a plurality of sequence key blocks, each storing the playlist selection information corresponding to each of the playback zones, by executing data processing on the basis of a cryptographic key stored in the information processing apparatus, thereby obtaining the playlist selection information from each of the plurality of sequence key blocks.

The playlist selector may sequentially obtain the plurality of pieces of playlist selection information stored in the register to select the playlists on the basis of the plurality of pieces of playlist selection information in accordance with commands of a movie object which is set as a playback processing program.

According to another embodiment of the present invention, there is provided an information processing method for playing back content including a plurality of divided playback zones, a playlist being associated with each of the divided playback zones. The information processing method includes the steps of obtaining a plurality of pieces of playlist selection information including information concerning a playback sequence of play items which are set as content playback unit data, the plurality of pieces of playlist selection information being obtained in accordance with the number of playback zones included in the content, selecting a plurality of playlists on the basis of the obtained plurality of pieces of playlist selection information, generating an integrated playlist by integrating the selected plurality of playlists, and playing back the content on the basis of the integrated playlist.

The content may be recorded on an information recording medium and may include segments portions, each having a plurality of variation data generated by encrypting an identical playback data portion with different cryptographic keys. When selecting the playlist selection information, playlist selection information corresponding to a playlist including a play item sequence that is defined by a playback path having variation data selected from each segment portion may be selected in accordance with each of the content playback zones, the playback path being selected in accordance with an information processing apparatus.

When selecting the playlist selection information, a plurality of sequence key blocks, each storing the playlist selection information corresponding to each of the playback zones, may be processed by executing data processing on the basis of a cryptographic key stored in an information processing apparatus so that the playlist selection information is obtained from each of the plurality of sequence key blocks.

When generating the integrated playlist, an integrated playlist in which the information concerning the playback sequences of the play items included in the plurality of playlists is set as one play item sequence may be generated.

The content may be played back by using a virtual file system that is accessible from the generated integrated playlist and by obtaining the play items specified in the integrated playlist.

According to another embodiment of the present invention, there is provided an information processing method for playing back content including a plurality of divided playback zones, a playlist being associated with each of the divided playback zones. The information processing method includes the steps of obtaining a plurality of pieces of playlist selection information including information concerning a playback sequence of play items which are set as content playback unit data, the plurality of pieces of playlist selection information being obtained in accordance with the number of playback zones included in the content, storing the obtained plurality of pieces of playlist selection information in a register, sequentially obtaining the plurality of pieces of playlist selection information stored in the register to select playlists on the basis of the plurality of pieces of playlist selection information, and playing back the content on the basis of the selected playlists.

The content may be recorded on an information recording medium and may include segments portions, each having a plurality of variation data generated by encrypting an identical playback data portion with different cryptographic keys. When selecting the playlist selection information, playlist selection information corresponding to a playlist including a play item sequence that is defined by a playback path having variation data selected from each segment portion may be selected in accordance with each of the content playback zones, the playback path being selected in accordance with an information processing apparatus.

When selecting the playlist selection information, a plurality of sequence key blocks, each storing the playlist selection information corresponding to each of the playback zones, may be processed by executing data processing on the basis of a cryptographic key stored in an information processing apparatus so that the playlist selection information is obtained from each of the plurality of sequence key blocks.

When selecting the playlists, the plurality of pieces of playlist selection information stored in the register may be sequentially obtained so that the playlists are selected on the basis of the plurality of pieces of playlist selection information in accordance with commands of a movie object which is set as a playback processing program.

According to another embodiment of the present invention, there is provided an information recording medium including content having a plurality of divided playback zones, each divided playback zone including segment portions having a plurality of variation data generated by encrypting an identical playback data portion with different cryptographic keys, and a plurality of playlist selection information storage blocks, each being set in association with the corresponding playback zone, the content and the plurality of playlist selection information storage blocks being stored in the information recording medium. Each of the plurality of playlist selection information storage blocks stores a plurality of different pieces of playlist selection information corresponding to different playback paths, the playback path being determined in accordance with an information processing apparatus that plays back the content.

Each of the plurality of playlist selection information storage blocks may store a plurality of different pieces of playlist selection information corresponding to each content playback zone, and the plurality of different pieces of playlist selection information may correspond to a plurality of different playlists including play item sequences that are defined by a plurality of different playback paths having variations data selected from each segment portion, the playback path being selected in accordance with the information processing apparatus that plays back the content stored in the information recording medium.

Each of the plurality of playlist selection information storage blocks may obtain playlist selection information corresponding to a playlist defined by a playback path having variation data selected from each segment portion by executing data processing on the basis of a cryptographic key stored in the information processing apparatus that plays back the content stored in the information recording medium, the playback path being selected in accordance with the information processing apparatus.

Each of the plurality of playlist selection information storage blocks may include cryptographic generation information used for decrypting data forming the content located on the playback path including variation data selected from each segment portion, the playback path being selected in accordance with the information processing apparatus that plays back the content stored in the information recording medium.

According to another embodiment of the present invention, there is provided a computer program allowing an information processing apparatus to execute processing for playing back content including a plurality of divided playback zones, a playlist being associated with each of the divided playback zones. The computer program includes the steps of obtaining a plurality of pieces of playlist selection information including information concerning a playback sequence of play items which are set as content playback unit data, the plurality of pieces of playlist selection information being obtained in accordance with the number of playback zones included in the content, selecting a plurality of playlists on the basis of the obtained plurality of pieces of playlist selection information, generating an integrated playlist by integrating the selected plurality of playlists, and playing back the content on the basis of the integrated playlist.

According to another embodiment of the present invention, there is provided a computer program allowing an information processing apparatus to execute processing for playing back content including a plurality of divided playback zones, a playlist being associated with each of the divided playback zones. The computer program includes the steps of obtaining a plurality of pieces of playlist selection information including information concerning a playback sequence of play items which are set as content playback unit data, the plurality of pieces of playlist selection information being obtained in accordance with the number of playback zones included in the content, storing the obtained plurality of pieces of playlist selection information in a register, sequentially obtaining the plurality of pieces of playlist selection information stored in the register to select playlists on the basis of the plurality of pieces of playlist selection information, and playing back the content on the basis of the selected playlists.

The computer program according to an embodiment of the present invention can be provided to a computer system that can execute various program codes by a storage medium, a recording medium, such as a CD, a flexible disk (FD), or a magneto-optical (MO) disk, or a communication medium, such as a network, in a computer-readable format.

Further objects, features, and advantages of the present invention will become apparent from the following description of an exemplary embodiment with reference to the attached drawings.

According to the configuration of an embodiment of the present invention, when playing back content including a plurality of divided playback zones, a playlist being associated with each playback zone, classification numbers, which serve as playlist selection information including playback sequence information concerning play items which are set as content playback unit data, are individually obtained from a plurality of sequence key blocks (SKBs) which are set in accordance with the number of playback zones. Based on the obtained plurality of classification numbers, a plurality of playlists are generated, and the plurality of playlists are integrated into a new integrated playlist. Then, content is played back on the basis of the integrated playlist. In the above-described content playback processing, the SKB processing is finished before starting the content playback processing. Then, a plurality of playlists are obtained on the basis of the classification numbers calculated from the plurality of SKBs, and are integrated into a single playlist. Playback processing is then executed on the basis of the integrated playlist. With this configuration, play items can be selected, decrypted, and played back in accordance with the play item sequence set in the integrated playlist, which eliminates the need to switch playlists, thereby implementing seamless content playback processing.

According to the configuration of another embodiment of the present invention, classification numbers, which serve as playlist selection information, are individually obtained from a plurality of sequence key blocks (SKBs) which are set in accordance with the number of playback zones, and the obtained plurality of classification numbers are stored in a register. Then, the plurality of classification numbers stored in the register are sequentially obtained and the playlists are selected based on the classification numbers in response to movie object commands. The content is then played back on the basis of the selected playlists. In the above-described content playback processing, the SKB processing is finished before starting the content playback processing. Then, playlists are selected on the basis of the classification numbers that are set in the register. With this configuration, the seamless content playback operation can be implemented without the need for the time to switch playlists.

BRIEF DESCRIPTION OF THE DRAWINGS

FIG. 6 illustrates the configuration of a sequence key file stored in an information processing apparatus;

FIG. 17 is a functional block diagram illustrating an information processing apparatus that executes content playback processing including playlist integrating processing executed on the basis of a playlist integrating processing program;

FIG. 18 illustrates processing for setting classification numbers obtained from a plurality of SKBs in a register;

FIGS. 19A and 19B respectively illustrate an example of movie object commands that obtain classification numbers from a register and select and switch playlists, and playback processing on the basis of the movie object commands;

DESCRIPTION OF THE PREFERRED EMBODIMENTS

Details of an information processing apparatus, an information processing method, an information recording medium, and a computer program according to an embodiment of the present invention are described below in the following order of sections with reference to the accompanying drawings.

Figure 1:
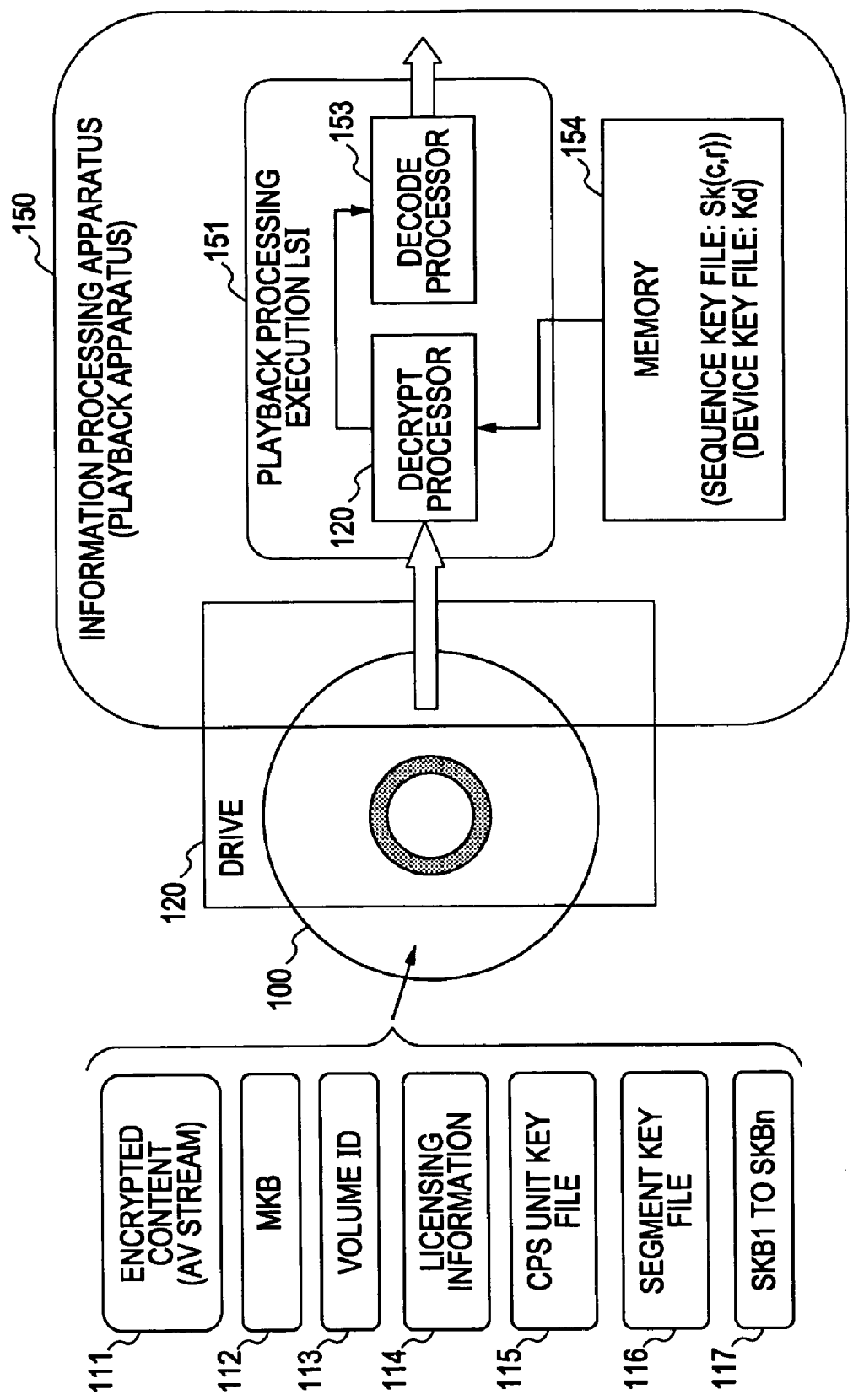
FIG. 1 is a block diagram illustrating the configuration of data stored in an information recording medium and the configuration of an information processing apparatus that executes playback processing.

1. Overview of Storage Data of Information Recording Medium and Information Processing Apparatus
2. Detailed Structure of Storage Data of Information Recording Medium
2. 1. CPS Unit
2. 2. Segment
3. Configuration and Processing of Sequence Key Block (SKB)
4. Content Playback Processing Basic Sequence in Information Processing Apparatus
5. Content Playback Processing Using Plurality of Playlists
6. Example of Configuration of Information Processing Apparatus 1. Overview of Storage Data of Information Recording Medium and Information Processing Apparatus An overview of storage data of an information recording medium and an information processing apparatus is first discussed. In FIG. 1, the configuration of an information processing medium 100 and an information processing apparatus (playback apparatus) 150 storing content therein is shown. In FIG. 1, information is stored in a ROM disc, which serves as a content storage disc. The information processing apparatus 150 is, for example, a PC or a playback-only device, and includes a drive 120 for reading data from the information recording medium 100.

A ROM disc as the information recording medium 100, such as a Blu-ray disc (trademark) or a DVD, storing authorized content, is manufactured in a disc manufacturing factory with the permission of a so-called "content right holder" having an authorized content copyright or distribution right. In the following embodiment, as the information recording medium, a disc medium is used. In the present invention, however, various forms of information recording media can be used.

The information recording medium 100 stores, as shown in FIG. 1, encrypted content 111 subjected to encrypt processing, a media key block (MKB) 112, which serves as a cryptographic key block, generated based on a tree-structure key distribution system, which is known as one mode of a broadcast encryption system, a volume ID 113, which is set as identification information for each information recording medium or a predetermined number of information recording media, licensing information 114 including copy control information (CCI) as content copy/playback control information, a content management unit (CPS) unit key file 115 storing a CPS unit key, which is a cryptographic key set for each CPS unit, which serves as a content usage management unit, a segment key file 116, which is a file for obtaining segment keys used as cryptographic keys for segment data generated by encrypting part of the content stored in the information recording medium 100 with the different cryptographic keys, and sequence key block sets (SKB1 through SKBn) 117 storing information necessary for obtaining the segment keys from the segment key file 116. The sequence key block sets (SKB1 through SKBn) 117 are formed of, for example, six sequence key blocks (SKB1 through SKB6). An overview of various items of information is discussed below.

Encrypted Content 111

In the information recording medium 100, various items of content data, such as audiovisual (AV) streams of moving picture content, for example, high definition (HD) movie content, game programs, image files, sound data, and text data, defined by specific standards, are stored. Those items of content are specific AV format standard data, which are stored according to specific AV data formats. More specifically, for example, content is stored as the Blu-ray disc (trademark) ROM standard data according to the Blu-ray ROM standard format. Those items of content are referred to as "main content".

Game programs, image files, sound data, or text data, which serve as service data, may be stored as "sub-content". The sub-content is data having a data format which is not compliant with a specific AV data format. That is, such data can be stored as Blu-ray disc (trademark) ROM nonstandard data according to a certain format which is not compliant with the Blu-ray disc (trademark) ROM standard format.

As the types of content, both the main content and the sub-content include various content, such as music data, image data, for example, moving pictures and still images, game programs, and WEB content. Such content includes various modes of information, such as content information that can be used only by data from the information recording medium 100, and content information that can be used by a combination of the data from the information recording medium 100 and data provided from a server connected to the recording medium 100 via a network. To individually control the use of each segment of content, the content stored in the information recording medium 100 is stored by assigning different keys (title keys) to segments and by encrypting each segment with a key (title key), which is different from those for the other segments. The unit to which one title key is assigned is referred to as a "content management unit (CPS unit)".

Content includes a plurality of segment portions generated by encrypting part of the content with different cryptographic keys. The content is played back in accordance with a specific path (sequence) which is set by selecting specific segment data from the plurality of segment portions. The file for storing data for obtaining segment keys for decrypting segment data (encrypted data) having a specific variation, which is set for each segment, is the segment key file. For playing back content, it is necessary to obtain a plurality of CPS unit keys and a plurality of segment keys based on a specific path (sequence). Details of those processing operations are given below.

MKB

The MKB 112 is a cryptographic key block generated based on a tree-structure key distribution system, which is known as one mode of the broadcast encryption method. The MKB 112 is a key information block that makes it possible to obtain a media key (Km), which is a key necessary for decrypting content, only by processing (decryption) on the basis of a device key (Kd) stored in information processing apparatuses having valid licenses. The MKB 112 is based on an information distribution system according to a so-called hierarchical tree structure. The MKB 112 makes it possible to obtain the media key (Km) only when a user device (information processing apparatus) has a valid license, and to disable revoked user devices from obtaining the media key (Km).

By changing the device key used for encrypting key information stored in the MKB 112, a management center, which serves as a license entity, allows the MKB 112 to disable a device key stored in a specific user device from decrypting content, that is, makes the user device unable to obtain the media key necessary for decrypting the content. It is thus possible to provide encrypted content only to devices having valid licenses while revoking unauthorized devices at a suitable time. Content decrypt processing is discussed below.

Volume ID

The volume ID 113 is an ID set as identification information for each information recording medium or a predetermined number of information recording media. The volume ID 113 is used as information for generating a key for decrypting content. The processing using the volume ID 113 is discussed below.

Licensing Information

Licensing information includes, for example, copy/playback control information (CCI), that is, copy restriction information or playback restriction information used for controlling the use of the encrypted content 111 stored in the information recording medium 100. The copy/playback control information (CCI) may be set in various manners, such as being set for each CPS unit, which serves as the content management unit, or for a plurality of CPS units. Details of the licensing information are given in the following section.

CPS Unit Key File

The encrypted content 111 stored in the information recording medium 100 is encrypted by a unique cryptographic key, which is used for the corresponding CPS unit set as the content management unit, as described above. AV streams, music data, image data, such as moving pictures and still images, game programs, and WEB content forming content are segmented into CPS units, which serve as content usage management units. When performing playback processing, it is necessary that an information processing apparatus determine the CPS unit to which the content to be played back belongs, and perform decrypt processing by using the CPS unit key as the cryptographic key corresponding to the determined CPS unit. The file storing data necessary for obtaining the CPS unit key is the CPS unit key file 115. Details of the CPS unit key file 115 are given below. To play back content, not only the CPS unit key, but also various other key information and key generation information, should be applied. Specific processing of such information is also discussed below.

Segment Key File

As stated above, the content stored in the information recording medium 100 is encrypted and stored on the basis of CPS units. Moreover, content belonging to one CPS unit includes segment data formed of a plurality of variations generated by encrypting part of the content with different cryptographic keys. The segment key file is a file for obtaining the segment keys used as the cryptographic keys for encrypting the segment data.

When performing playback processing, an information processing apparatus plays back content in accordance with a specific path (sequence) set by selecting specific segment data from each of the plurality of segments of the content. The file for storing data for obtaining segment keys for decrypting segment data (encrypted data) having a specific variation, which is set for each segment, is the segment key file. For playing back content, it is necessary to obtain a plurality of CPS unit keys and a plurality of segment keys based on a specific path (sequence).

That is, to play back content, it is necessary to decrypt content by switching CPS unit keys and segment keys corresponding to specific variations of segment data. A key string of segment keys based on a specific path is referred to as a "sequence key". Details of obtaining and using the segment key file and the segment keys are discussed below.

Sequence Key Block Sets (SKB1 through SKBn)

The sequence key block sets (SKB1 through SKBn) are set as a group of a plurality of different sequence key blocks (SKBs). Each sequence key block (SKB) stores therein classification numbers (variant Nos.) for selecting playlists that define playback paths and information (media key variables (Kmv)) for obtaining segment keys encrypted and stored in the segment key file 116. When decrypting the content, the information processing apparatus obtains the classification number (variant No.) and the media key variable (Kmv) from the corresponding SKB.

Each of the sequence key blocks (SKB1 through SKBn) contained in the sequence key block set 117 stores the above-described information. For example, one piece of content is divided into n playback zones, and information (classification numbers (variant Nos.) and media key variables (Kmv)) is obtained from the sequence key blocks (SKB1 through SKBn) in accordance with the divided playback zones 1 through n, respectively.

If six SKBs (SKB1 through SKB6) are stored in the information recording medium 100, to play back content stored in the information recording medium 100, it is necessary for the information processing apparatus 150 to perform processing by using the six classification numbers (variant Nos.) and media key variables (Kmv). Details of such processing are discussed below.

FIG. 1 illustrates the schematic configuration of the information processing apparatus 150 executing playback processing for the content stored in the information recording medium 100. The information processing apparatus 150 includes the drive 120 for reading data stored in the information recording medium 100. The data read by the drive 120 is input into a playback processing execution LSI 151 that decrypts and decodes, for example, moving picture experts group (MPEG)-decodes, encrypted content.

The playback processing execution LSI 151 includes a decrypt processor 152 for executing decrypt processing on encrypted content and a decode processor 153 for executing decode processing, for example, MPEG-decode processing, on the encrypted content. The decrypt processor 152 generates a key for decrypting content by using various information stored in a memory 154 and the data read from the information recording medium 100, and then executes decrypt processing on the encrypted content 111.

In the memory 154, a sequence key file including a plurality of sequence keys SK(c, r) and a device key Kd are stored. In the sequence keys SK(c, r), c represents a column, and r designates a row. Although details are given below, the information processing apparatus 150 has one sequence key SK(c, r) associated with one of the rows (rows 0 to 255) for each of the columns (columns 0 to 255), i.e., the information processing apparatus 150 has a total of 256 sequence keys SK(c, r). The row number of sequence key SK(c, r) stored for each column varies according to each information processing apparatus or a predetermined group of information processing apparatuses, and information concerning the sequence key SK(c, r) is registered in the management center.

When decrypting encrypted content of the information recording medium 100, the information processing apparatus 150 generates a key for decrypting the content on the basis of the data stored in the memory 154 and the data read from the information recording medium 100, and then executes decrypt processing on the encrypted content 111.

The decrypt processor 152 also executes processing, such as obtaining the media key (Km) from the MKB 112 stored in the information processing medium 100 by using the device key Kd stored in the memory 154, and obtaining the information (classification number (variant No.) and media key variable (Kmv)) necessary for playing back content from the sequence key block (SKB) set 117 by using the media key (Km) and the sequence key in the sequence key file stored in the memory 154. Details of the above-described processing operations and content decrypt processing are discussed in the following section.

2. Detailed Structure of Storage Data of Information Recording Medium

Figure 2:
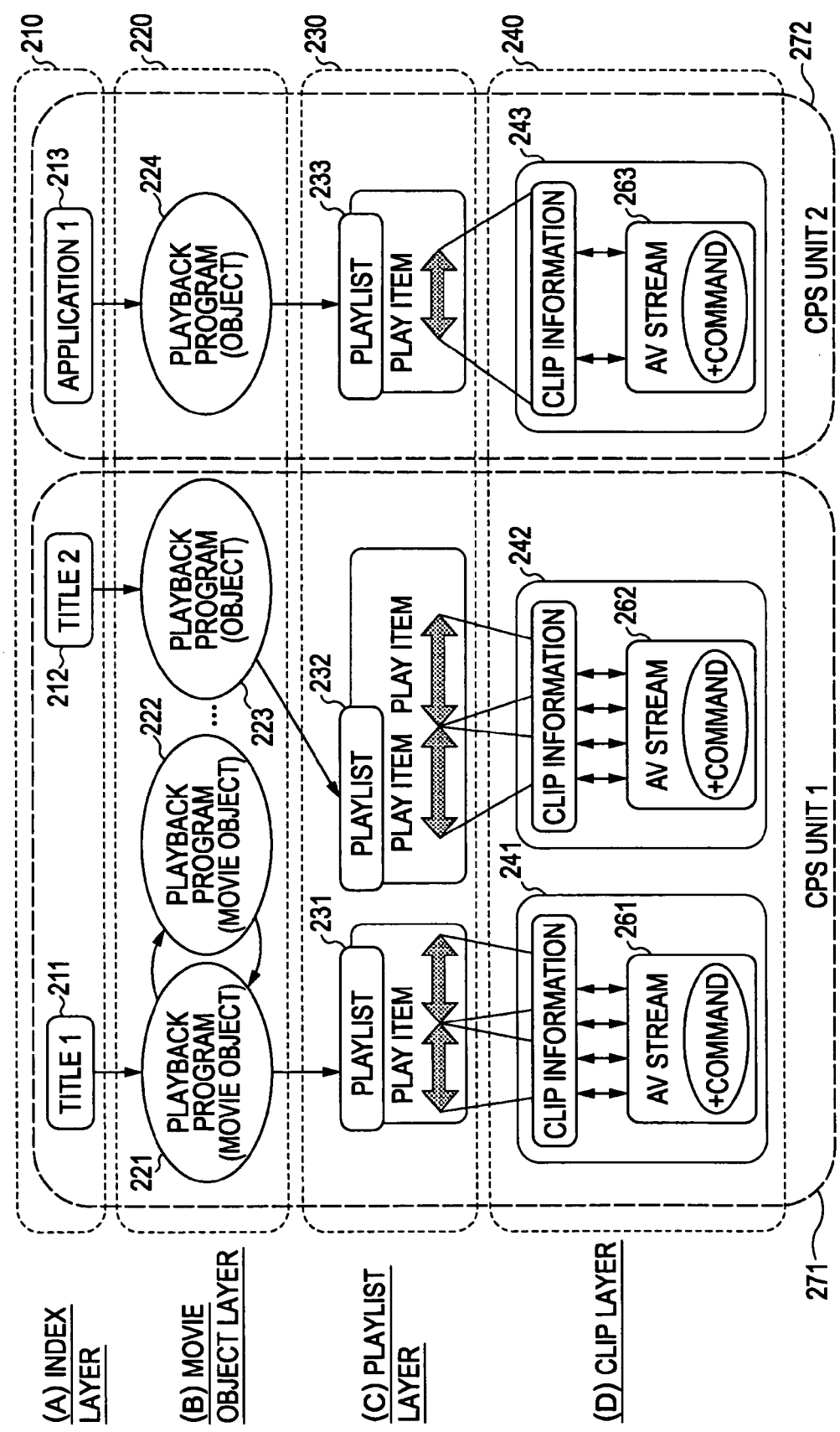
FIG. 2 illustrates examples of content management units that are set for content stored in an information recording medium.

A description is now given of the detailed structure of content stored in an information recording medium with reference to, for example, FIG. 2.

2. 1. CPS Unit

As stated above, to control the use of content based on different content units, content stored in an information recording medium is encrypted and stored by assigning different keys to content units. That is, the content is segmented into content management units (CPS units), and the CPS units are individually encrypted and usage control is performed for the individual CPS units.

To use content, it is necessary to first obtain a CPS unit key assigned to each unit, and then, by using the CPS unit key and other required keys and key generation information, data processing based on a predetermined decrypt processing sequence is executed to play back content. Examples of content management units (CPS units) are discussed below with reference to FIG. 2.

Content has, as shown in FIG. 2, a hierarchical structure including (A) an index layer 210, (B) a movie object layer 220, (C) a playlist layer 230, and (D) a clip layer 240. When designating an index, such as a title, accessed by a playback application, a playback program associated with the title is designated, and a playlist defining, for example, a content playback order, is selected according to program information concerning the designated playback program.

The index layer 210 includes various indexes, such as titles, which serve as application index files, containing content titles to be displayed on a display unit of a content playback device, applications, such as game content and WEB content, first playback information, which serves as playback content index information to be started when an information recording medium (disc) is installed in a drive, and a top menu, which serves as index information concerning content to be played back, displayed when a menu display function is started. Only titles and applications are shown in FIG. 2.

The movie object layer 220 is, for example, a playback processing program, and specifies a specific playlist to play back content according to a play item contained in the playlist.

A playlist includes one or more play items as information concerning zones to be played back. By playing back the play items included in the playlist, the content can be played back. According to clip information as a playback zone defined by the play items, AV streams or commands as real content data are selectively read to play back the AV streams or to execute the commands. There are a plurality of playlists or a plurality of play items, and playlist IDs or play item IDs are associated with the playlists or play items as identification information.

FIG. 2 shows two CPS units, which form part of content stored in an information recording medium. Each of a CPS unit-1 271 and a CPS unit-2 272 includes a title as an index, a movie object as a playback program file, a playlist, and an AV stream file as real content data.

The content management unit (CPS unit)-1 271 includes a title-1 211 and a title-2 212, playback programs 221 and 222, playlists 231 and 232, and clips 241 and 242. At least AV stream data files 261 and 262, which serve as real content data, contained in the two clips 241 and 242, respectively, are data to be encrypted, and are basically encrypted with a CPS unit key (Ku1), which is a cryptographic key associated with the content management unit (CPS unit)-1 271.

As stated above, content stored in the information recording medium includes segment portions which are obtained by encrypting part of the content with different cryptographic keys and which are encrypted with segment keys. Content is divided into segment portions and non-segment portions, and the non-segment portions are encrypted with the CPS unit key, and the segment portions are formed of a plurality of variations, which include segment data encrypted with different segment keys. Then, content is played back in accordance with a specific path (sequence) which is set by selecting specific segment data from each of the plurality of segment portions. In this case, non-segment portions are decrypted with the CPS unit key, while segment portions are decrypted with segment keys that can be obtained from the segment key file. Details of those processing operations are discussed below.

Various playback sequences in accordance with the various playback paths are defined by different playlists. If one playlist is selected from a plurality of playlists, the specific playback path can be defined, and a sequence of play items corresponding to part of the content in accordance with the playback path is obtained. Then, content can be played back in accordance with the play item sequence.

A play item includes segment portions obtained by encrypting part of the content with different cryptographic keys. An authorized playback device can decrypt the segment portions by using keys obtained by an authorized procedure.

As identification information for selecting one of the playlists, the classification number (variant No.) is used. As stated above, the classification number (variant No.) is obtained from the sequence key block (SKB). The information processing apparatus obtains the classification number (variant No.) by using the sequence key block (SKB) obtained from the information recording medium, and selects one of the playlists. If the playlist is selected, a specific play item sequence can be defined, and content can be played back in accordance with a specific playback path.

As discussed above, a plurality of SKBs, for example, n SKBs, i.e., SKB1 through SKBn, are stored in the information recording medium 100 shown in FIG. 1. Then, the information processing apparatus 150 executes SKBs to obtain n classification numbers (variant Nos.), and selects n playlists on the basis of the n classification numbers (variant Nos.). Then, the information processing apparatus 150 performs playback processing by switching the n playlists.

2.2 Segment

As stated above, content is divided into segment portions and non-segment portions, and the non-segment portions are encrypted with the CPS unit key, and the segment portions are formed of a plurality of variations, which include segment data encrypted with different segment keys. When playing back content, specific segment data are selected from a plurality of segment portions to set a specific path (sequence). Then, content is played back in accordance with the specific path. The non-segment portions are decrypted with the CPS unit key, and the segment portions are decrypted with segment keys that can be obtained from the segment key file.

It is sometimes necessary that the information processing apparatus obtain the CPS unit key corresponding to the non-segment portions and segment keys (Kseg) corresponding to the segment portions. The content configuration is discussed below with reference to FIG. 3.

Figure 3:
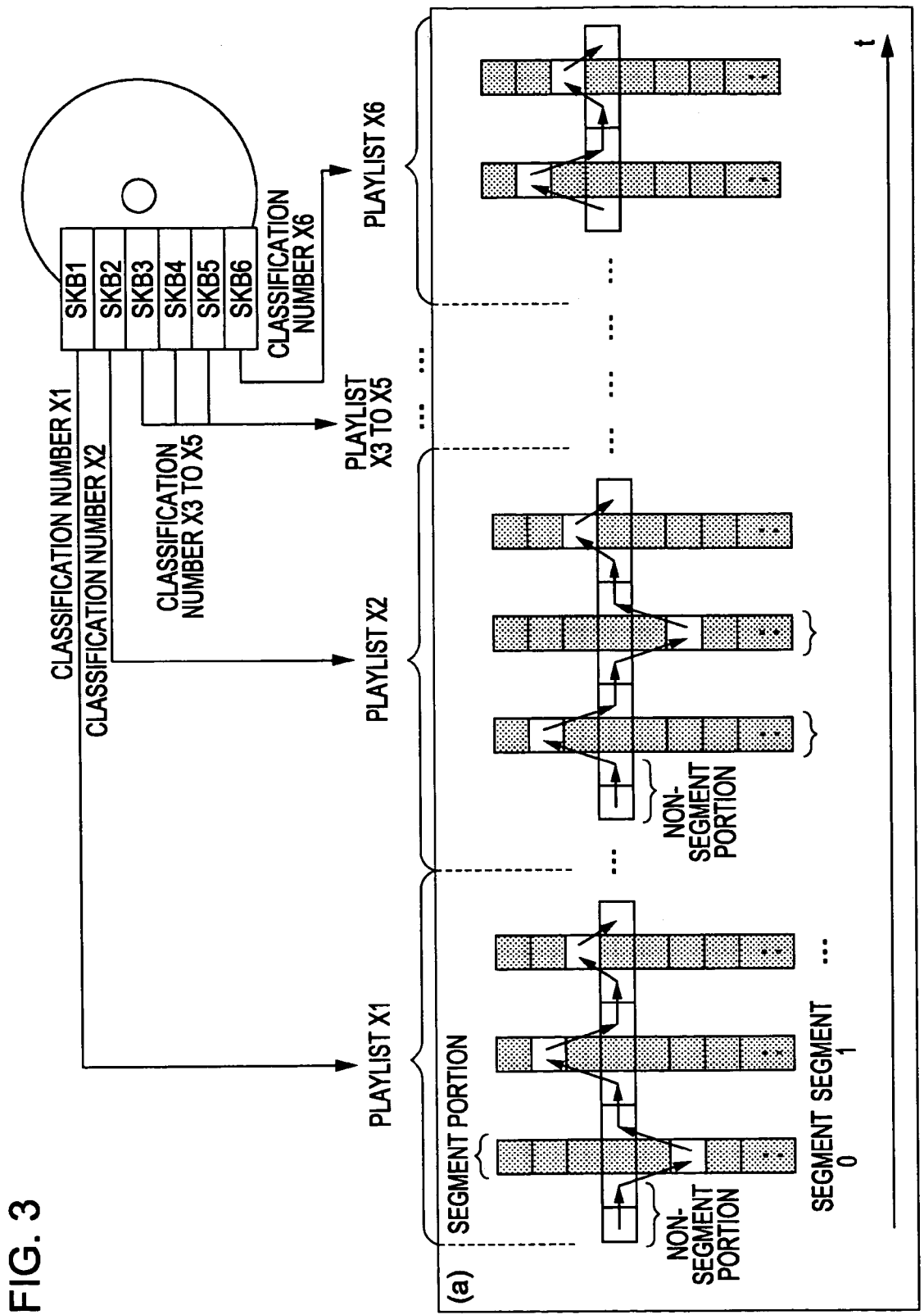
FIG. 3 illustrates the relationship between sequence key blocks (SKBs) stored in an information recording medium and playlists, and also illustrates setting of segments for content.

The configuration of content stored in an information recording medium is indicated in (a) in FIG. 3. It is now assumed that content is played back along the time axis t. The content is largely divided into n playback zones associated with n playlists X1 through Xn in accordance with classification numbers X1 through Xn obtained from n sequence key blocks (SKBs) stored in the information recording medium.

In the example shown in FIG. 3, n=6, and the content is largely divided into 6 playback zones associated with 6 playlists X1 through X6 in accordance with 6 classification numbers X1 through X6 obtained from 6 sequence key blocks (SKBs). In this example, the same identifiers X1 through X6 are used both for the classification numbers and the playlists. The purpose of using the same identifiers is only for easy understanding, and different identifiers may be used as long as the identifiers for the classification numbers are associated with those for the playlists.

Each playlist serves as information for setting a play item sequence that determines a playback path. For example, playlist X1 shown in FIG. 3 defines a playback path determined by selecting segment data in accordance with the arrows indicated in (a) in FIG. 3 for a content piece associated with playlist X1. Playlists X2 through X6 also define playback paths determined for corresponding content pieces. To play back content, the information processing apparatus determines classification numbers X1 through Xn from n sequence key blocks (SKBs) stored in the information recording medium, and defines playlists X1 through Xn determined in accordance with the classification numbers X1 through Xn. Then, the information processing apparatus plays back the content by sequentially using the playlists X1 through Xn.

For example, to play back content by using playlist X1, the information processing apparatus first selects a playback path determined in accordance with playlist X1, i.e., data that forms content (play items) indicated by the arrows in FIG. 3. Content is divided into segment portions and non-segment portions, and the non-segment portions are encrypted with the CPS unit key, and the segment portions are formed of a plurality of variations, which include segment data encrypted with different segment keys.

To play back the content, the non-segment portions are decrypted with the CPS unit key, and the segment portions are decrypted by selecting specific segment data defined by the playlist and by decrypting the selected segment data with segment keys that can be obtained from the segment key file.

The same applies to playlists X2 through X6. Playback processing is performed in accordance with the playback paths defined by playlists X2 through X6.

Figure 4:
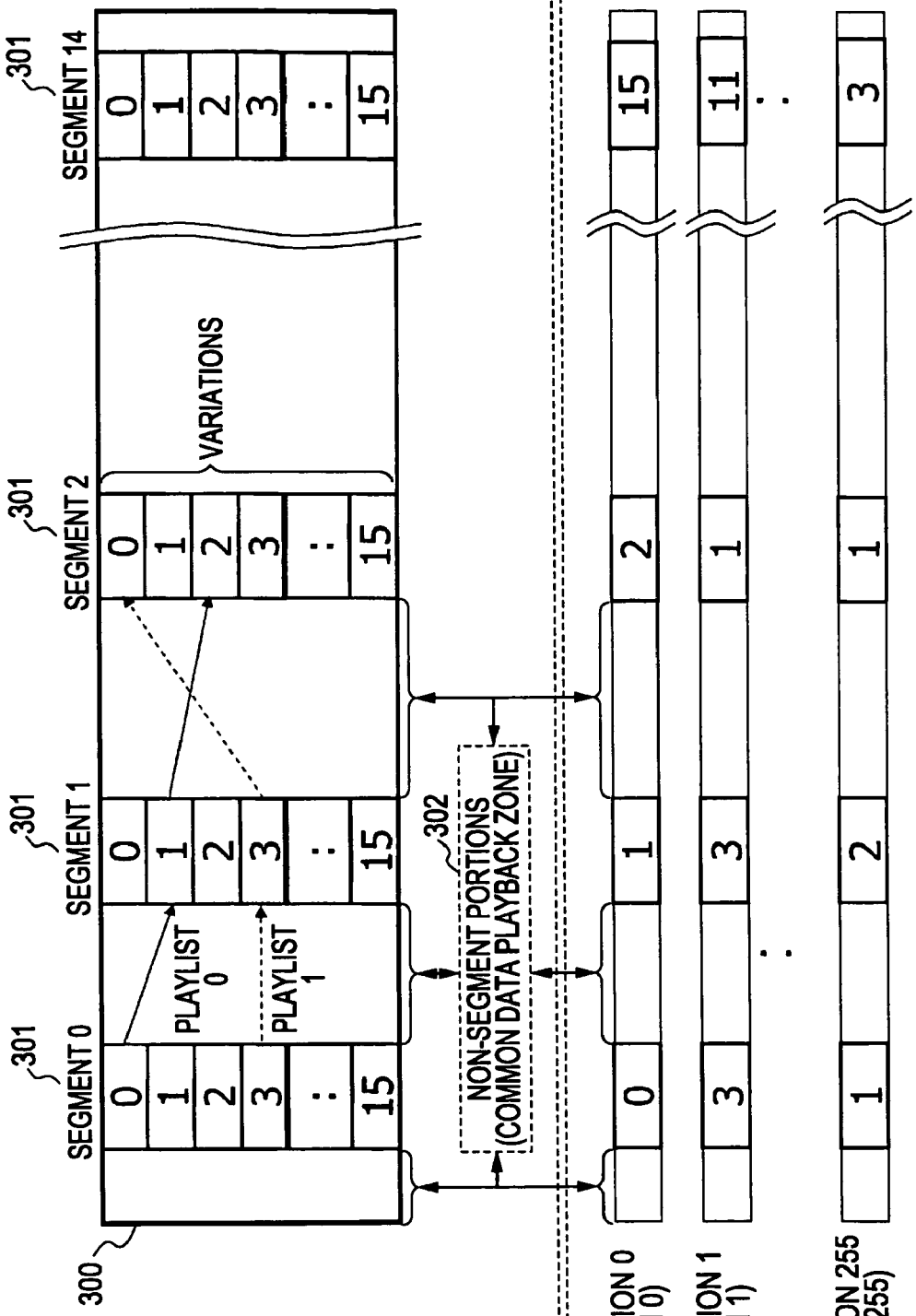
FIG. 4 illustrates setting of segments for content.

In the upper part (a) in FIG. 4, zone data, which corresponds to individual playlists, of content stored in an information recording medium, for example, playback zone data of content belonging to playlist X1 shown in FIG. 3, is shown. Content playback zone data 300 is, for example, one piece of movie content which forms title "xx story", i.e., content playback zone data corresponding to one playlist selected by the classification number obtained from one SKB.

The content playback zone data 300 includes, as shown in FIG. 4, a plurality of segment portions 301 and a plurality of non-segment portions 302. It is now assumed that the playback data is stored along the playback time axis from the left to the right in FIG. 4. An information processing apparatus to play back the content playback zone data 300 alternately plays back the non-segment portions 302 and the segment portions 301 from the left. The non-segment portions 302 are content portions that can be played back by obtaining the above-described CPS unit key (Ku), i.e., content portions that can be played back by being decrypted with the obtained CPS unit key (Ku), which is common for all information processing apparatuses.

Figure 15:
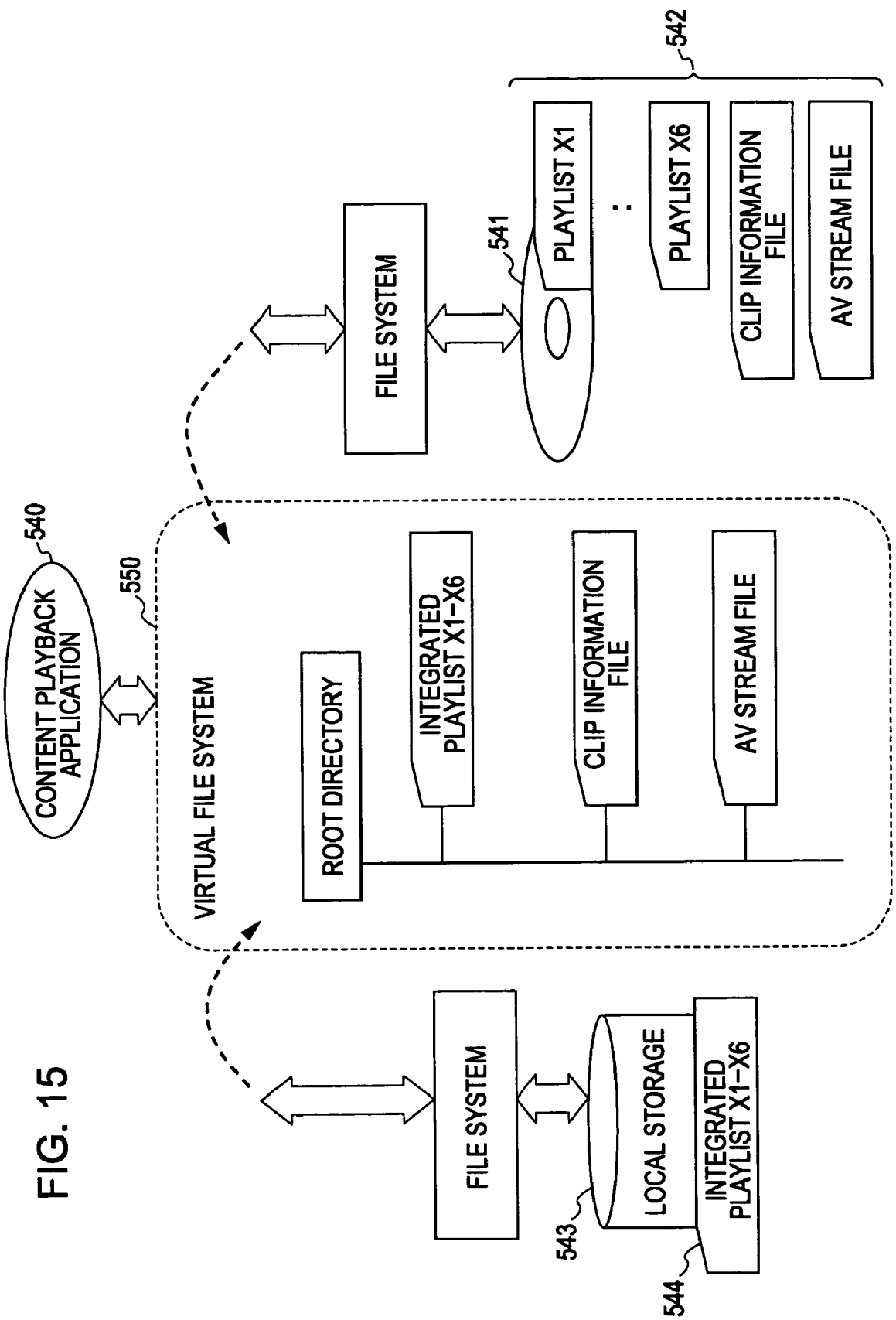
FIG. 15 illustrates content playback processing using a virtual file system.

On the other hand, it is necessary that the segment portions 301 be decrypted by obtaining keys different from the above-described CPS unit key (Ku), i.e., segment keys (Kseg) associated with the variations of the segments. The number of segments in one piece of content is, for example, as shown in FIGS. 4, 15 from 0 to 14. Each of the plurality of segment portions 301 is formed of segment data having 16 variations from 0 to 15.

As stated above, the content is divided into a plurality of (n) playback zone data, and if 15 segments are set in each playback zone data, n×15=15n segments are set in the entire content.

The 16 segment data contained in each segment portion 301 indicate all the same data (for example, the same playback image scene of a movie for several seconds). For example, the 16 segment data including 16 variations contained in segment 0 store the scene after the non-segment portion 302 located before segment 0 (at the left of segment 0 in FIG. 4).

The 16 segment data having variations 0 to 15 contained in segment 0 indicate data associated with the same scene, but are encrypted with different segment keys Kseg(0, 0) through Kseg(0, 15).

If the segment key is indicated by Ks(x, y), x represents the segment number and y designates the variation number. That is, the segment key Ks(x, y) is a segment key having a segment number x and a variation number y. All the segment data (15×16=240) contained in segment 0 to segment 14 shown in FIG. 4 are data encrypted with segment keys Kseg(0, 0) through Kseg(14, 15) associated with the corresponding segment data.

An information processing apparatus to play back content can decrypt only one segment data selected from the 16 segment data having variations 0 to 15 contained in segment 0. For example, information processing apparatus A can obtain only one segment key Kseg(0, 0) from the segment keys Kseg(0, 0) through Kseg(0, 15), and information processing apparatus B can obtain only one segment key Kseg(0, 3) from the segment keys Kseg(0, 0) through Kseg(0, 15).

Similarly, the 16 segment data having variations 0 to 15 contained in segment 1 indicate data generated by encrypting a common scene with different segment keys Kseg(1, 0) through Kseg(1, 15). Also concerning the 16 segment data having variations 0 to 15 contained in segment 1, an information processing apparatus can decrypt only one segment data selected from the 16 segment data having variations 0 to 15 contained in segment 1. For example, information processing apparatus A can obtain only one segment key Kseg(1, 1) from the segment keys Kseg(1, 0) through Kseg(1, 15), and information processing apparatus B can obtain only one segment key Kseg(1, 3) from the segment keys Kseg(1, 0) through Kseg(1, 15).

To play back content, each information processing apparatus selects the playlist on the basis of the classification number obtained from the sequence key block (SKB) stored in the information recording medium.

The playback path that can be set for each information processing apparatus is determined by the playlist selected on the basis of the classification number obtained from the sequence key block (SKB) processed by the information processing apparatus.

For example, the playback path indicated by the arrows in the solid lines in (a) in FIG. 4 is a playback path corresponding to playlist 0, and the playback path indicated by the arrows in the broken lines in (a) in FIG. 4 is a playback path corresponding to playlist 1. Those playlist paths correspond to play item sequences defined by the playlists selected on the basis of the classification numbers obtained form the sequence key blocks (SKBs).

In the example shown in FIG. 4, the information processing apparatus that has selected playlist 0 selects data of variation number 0 in segment 0 and selects data of variation number 1 in segment 1, and so on, and decrypts the data with the corresponding segment keys. The selected data can be represented by the playback sequence indicated in (1) of the lower part (b) of FIG. 4. The information processing apparatus that has selected playlist 1 selects data of variation number 3 in segment 0 and selects data of variation number 3 in segment 1, and so on, and decrypts the data with the corresponding segment keys. The selected data can be represented by the playback sequence indicated in (2) of the lower part (b) of FIG. 4. Concerning the non-segment portions 302, all information processing apparatuses obtain the common key (CPS unit key (Ku)) to decrypt the same data.

If the number of segments is 15 and if the number of variations is 16, $16^{15}$ different paths can be set. In one piece of content to be played back by a combination of 6 playlists obtained on the basis of 6 SKBs, $16^{15 \times 6}$ different paths can be set.

Although in reality $16^{15}$ different versions can be set in a playback zone associated with one playlist selected by one SKB, it is almost impossible to possess a playlist corresponding to $16^{15}$ different paths. Accordingly, an example in which 256 paths from 0 to 255 are set in one playback zone in association with one SKB is described below.

An information processing apparatus that has obtained one classification number from among classification number 0 to classification number 255 for a certain piece of content, as shown in (b) in FIG. 4, performs a playback operation according to the corresponding path selected from among path 0 to path 255. Those 256 paths are different paths.

A content production or editing entity can select a desired path for each playlist. The suitable SKB can be set for a piece of content so that the corresponding classification numbers 0 to 255 are determined, and then, the corresponding playlist is suitably set. With this arrangement, the desired path assigned to the information processing apparatus can be set.

If 256 playback paths are set for one playback zone, 256 playlists are set for one playback zone and are recorded on content data. As discussed above, one piece of content includes a plurality of playback zone data associated with the corresponding SKBs. If there are n SKBs, i.e., SKB1 through SKBn, 256 playlists are set for each SKB, and thus, the number of playlists prepared for one piece of content are n×256=256n.

If only one SKB is used for preparing a sufficient number of playlists for specifying playback devices, the number of playlists equal to the number of variations to the power of the number of segments ($256^n$ in the above-described example) are necessary. By using a plurality of SKBs, however, many variations of playback paths can be set by a smaller number of playlists, and in case of illegal distribution of content, it becomes possible to specify the distribution source by checking the playback path of the illegally distributed content. To play back content, the information processing apparatus sequentially selects the playlists associated with the playback zone data. Details of the selection of playlists and content playback processing are described below.

3. Configuration and Processing of Sequence Key Block (SKB)

The configuration and processing of sequence key blocks (SKBs) stored in an information recording medium are discussed below. As stated above, a sequence key block set (SKB1 through SKBn), which is a group of a plurality of different sequence key blocks, is stored in the information recording medium.

Each of the sequence key blocks (SKB1 through SKBn) stores classification numbers (variant Nos.) for selecting playlists that define playback paths and information (media key variables (Kmv)) used for decrypting encrypted segment keys stored in the segment key file 116. An information processing apparatus to play back content obtains such information from each SKB.

Figure 5:
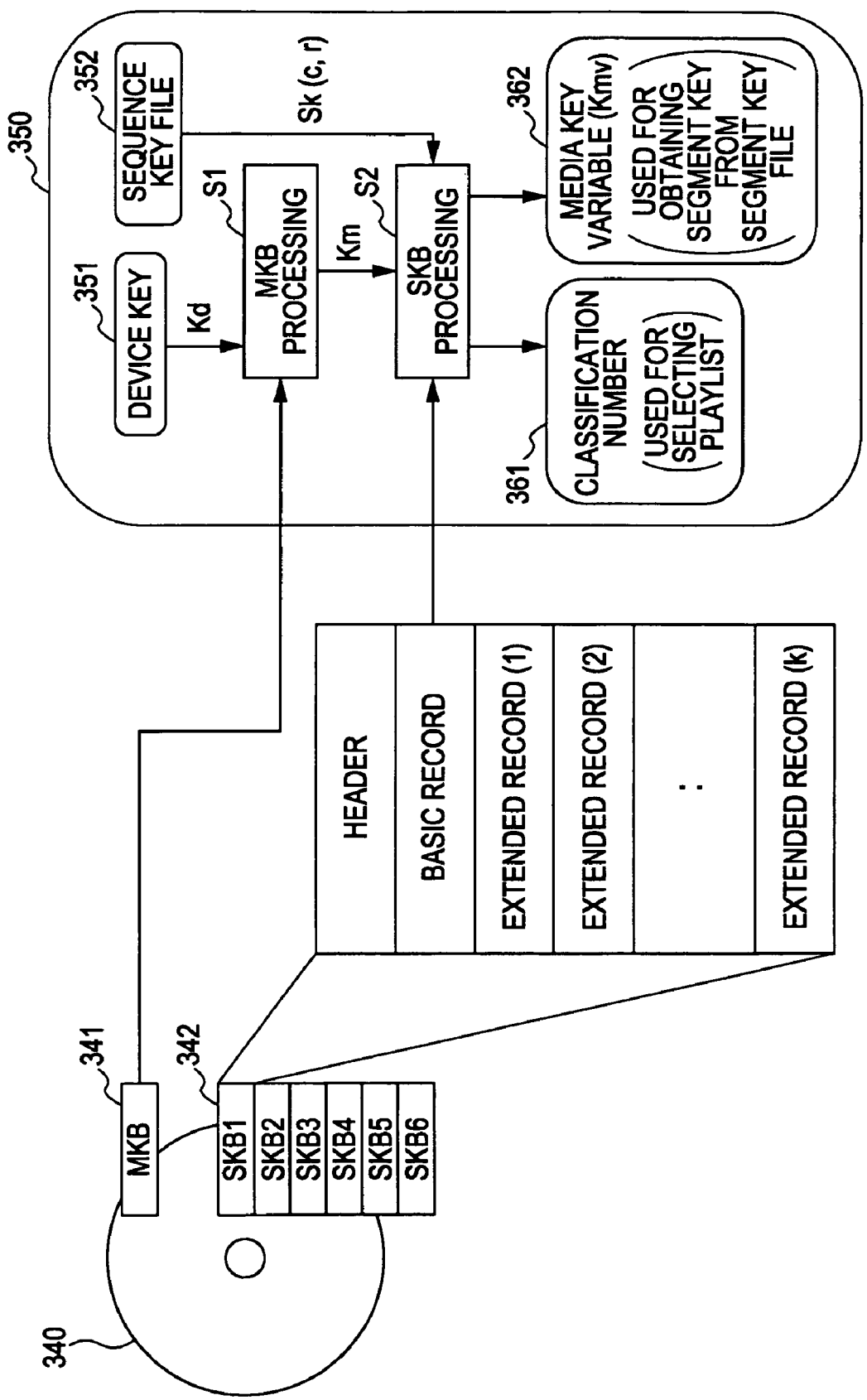
FIG. 5 illustrates the data configuration of a sequence key block (SKB) and SKB processing executed by an information processing apparatus.

FIG. 5 illustrates an information recording medium 340 in which a media key block (MKB) 341, which serves as a cryptographic key block, and a sequence key block (SKB) set 342 are stored, and also illustrates a sequence of the processing executed by an information processing apparatus 350. Only MKB and SKBs are shown in FIG. 1 since a description is given of MKB and SKB processing only, though various other data discussed with reference to FIG. 1, such as encrypted content, are stored in the information recording medium 340.

The MKB 341, which serves as a cryptographic key block, is generated based on a tree-structure key distribution system, which is known as one mode of a broadcast encryption system, and the media key (Kd) can be extracted by performing processing using a device key 351 stored in the memory of the information processing apparatus 350.

As discussed above, the media key (Km) can be obtained only when a user device (information processing apparatus) has a valid license, and revoked user devices are disabled from obtaining the media key (Km). By changing the device key used for encrypting key information stored in the MKB, a management center, which serves as a license entity, allows the MKB to disable the device key stored in a specific user device from decrypting content, that is, makes the user device unable to obtain the media key necessary for decrypting the content. It is thus possible to provide encrypted content only to devices having valid licenses while revoking unauthorized devices at a suitable time.

The sequence key block (SKB) set 342 includes a plurality of sequence key blocks (SKB1 through SKBn). As discussed above, one SKB is set in association with one of the playback zones 1 through n, which are content playback zone data. The sequence key blocks (KB1 through SKBn) allow the acquisition of playlist specifying information, such as classification numbers.

The sequence of the processing executed by the information processing apparatus 350 shown in FIG. 5 is as follows. In step S1, the information processing apparatus 350 executes MKB processing by using the device key (Kd) stored in the memory of the information processing apparatus 350 to obtain the media key (Km). If the information processing apparatus 350 is not a revoked device, it can successfully execute MKB processing to obtain the media key (Km). If the information processing apparatus 350 is a revoked device, MKB processing fails so that the information processing apparatus 350 is unable to obtain the media key (Km). In this case, the content playback processing is terminated.

If the information processing apparatus 350 has successfully executed MKB processing to obtain the media key (Km), in step S2, the information processing apparatus 350 executes SKB processing by using the obtained media key (Km) and the sequence key obtained from the sequence key file. The information processing apparatus 350 can then obtain a classification number 361 and a media key variable (Kmv) 362.

The classification number 361 is used as information for selecting a playlist, as stated above. The media key variable (Kmv) 362 is used as information for obtaining the segment keys used for decrypting the segment data contained in the playback path defined by the selected playlist from a segment key file.

The data configuration of the sequence key file stored in the information processing apparatus is discussed below with reference to FIGS. 6 and 7. The information processing apparatus has one sequence key (c, r) corresponding to one row for each of the columns 0 to 255. In the example shown in FIG. 6, the information processing apparatus has sequence keys (c, r), such as a sequence key SK(0, 1) at row r=1 and column c=0, a sequence key SK(1, 21) at row r=21 and column c=1, and a sequence key SK(2, 128) at row r=128 and column c=2. That is, the information processing apparatus has one sequence key for each of the 256 columns, i.e., a total of 256 sequence keys.

The combinations of sequence keys may be different for individual information processing apparatuses, or the same combination of sequence keys may be assigned to a certain group of information processing apparatuses.

Figure 7:
FIG. 7 illustrates an example of the configuration of a sequence key file stored in an information processing apparatus.

For example, the configuration of the sequence key file storing the sequence keys in the information processing apparatus shown in FIG. 6 is shown in FIG. 7. In the sequence key file, a sequence key (c, r) corresponding to one row for each of the columns 0 to 255, which serve as sequence numbers, is stored.

The information concerning the columns 0 to 255 as the sequence numbers is equivalent to the information designated by the SKBs, which are stored in the information recording medium, and correspond to the content stored in the information recording medium. One column is designated by the corresponding SKB for each piece of content or for a content group stored in the information recording medium, such as the seventh column is assigned to content A and the twelfth column is assigned to content B.

In step S2 in FIG. 5, the information processing apparatus 350 obtains the column information from the SKB to acquire the sequence key SK corresponding to the column from the sequence key file. The information processing apparatus 350 then executes SKB processing by using the media key (Km) obtained by the MKB processing and sequence key SK(c, r) to obtain playlist selection information, such as the classification number (variant No.) 361, and information, such as the media key variable (Kmv) 362, used for decrypting the encrypted segment keys stored in the segment key file.

The classification number 361 and the media key variable (Kmv) 362 are information individually obtained from one sequence key block (SKB). As discussed above, to play back one piece of content, n playlists are selected by executing n (for example, 6) SKB1 through SKBn. Accordingly, if the sequence key block (SKB) set 342 includes 6 sequence key blocks (SKB1 through SKB6), the information processing apparatus 350 executes SKB processing 6 times in step S2 to obtain 6 classification numbers and 6 media key variables (Kmv). Then, for the individual playback zones, the information processing apparatus 350 selects the playlists corresponding to the classification numbers and obtains the segment keys from the segment key file by using the media key variables (Kmv). The specific processing sequence is discussed below.

One SKB includes, as shown in FIG. 5, header information, a basic record, and a plurality of extended records (1) through (k). The header information includes identification information and configuration information concerning the corresponding SKB. The basic record and the extended records (1) through (k) have substantially the same configuration, and all the records include the classification numbers and the media key variables (Kmv).

The SKB processing executed by the information processing apparatus for obtaining the classification numbers and media key variables (Kmv) is described below with reference to FIG. 8. One SKB is shown in (a) in FIG. 8, and the configuration of a basic record is shown in (b) in FIG. 8.

The information processing apparatus first selects the basic record from the SKB including the basic record and the plurality of extended records (1) through (k), and then obtains the column information contained in the basic record. The column information corresponds to the sequence number discussed with reference to FIGS. 6 and 7, and the information processing apparatus selects the sequence key SK(c, r) associated with the column information designated by the SKB from the sequence key file shown in FIG. 7. The sequence key SK(c, r) to be selected is different depending on the information processing apparatus. In the sequence key SK(c, r), r indicates the row number and ranges from 0 to 255.

Figure 8:
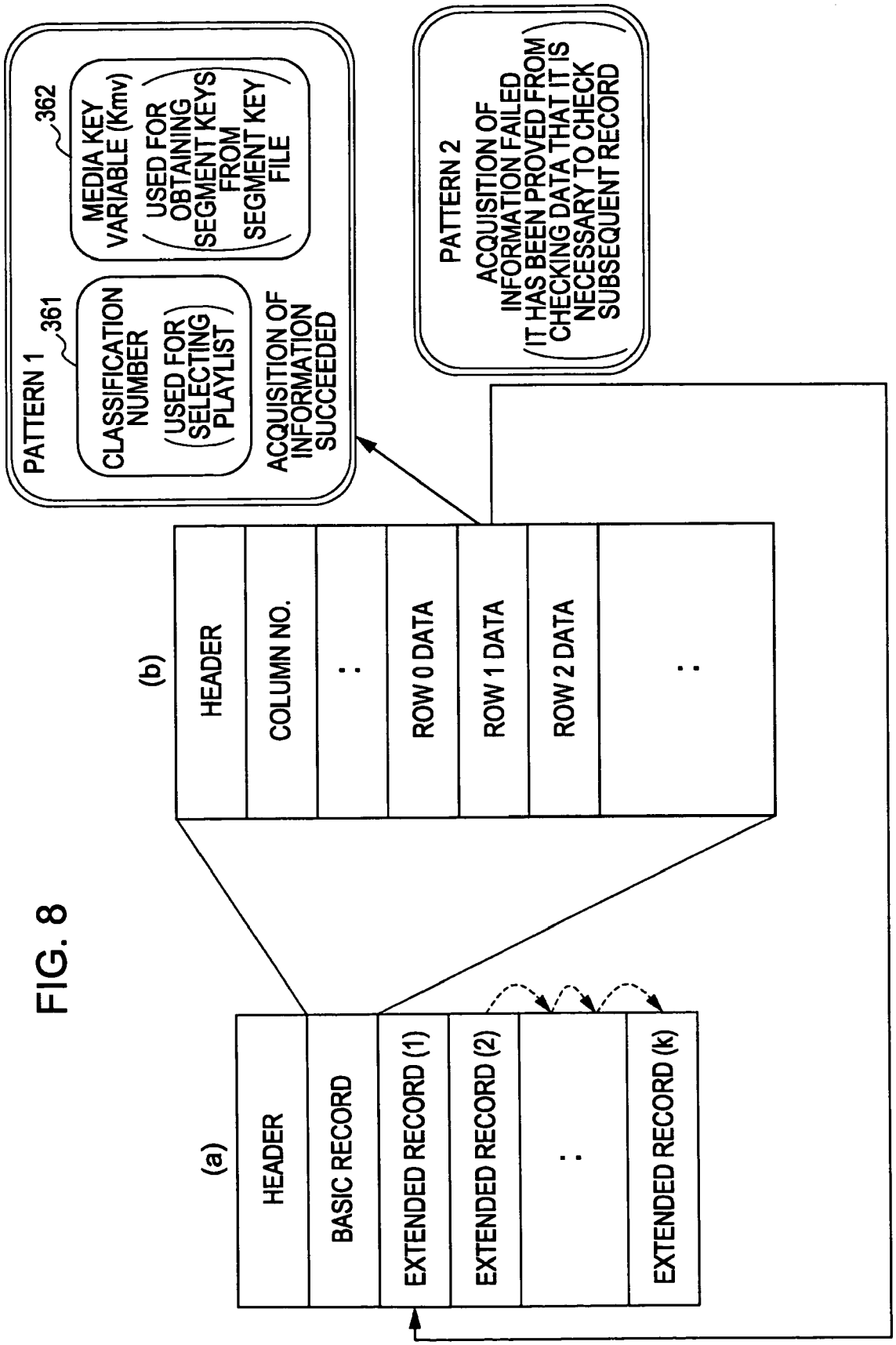
FIG. 8 illustrates the data configuration of a sequence key block (SKB) and SKB processing executed by an information processing apparatus.

The basic record of the SKB stores, as shown in (b) in FIG. 8, data to be processed, i.e., row 0 data, row 1 data, . . . , and row 255 data, associated with the corresponding rows. The information processing apparatus selects data to be processed in accordance with the row number (r) of the sequence key owned by the information processing apparatus. For example, if the column number c contained in the basic record of the SKB shown in (b) in FIG. 8 is 0, the information processing apparatus obtains the sequence key SK(0, 1) from the sequence key file shown in FIG. 7.

Since the row number (r) of the sequence key SK(c, r)=SK(0, 1) is 1, the information processing apparatus selects the row 1 data in the basic record, and executes SKB processing on the row data 1 by using the media key (Km) obtained by the MKB processing and the sequence key SK(0, 1) to obtain playlist selection information, such as the classification number (variant no.) 361, and information, such as media key variable (Kmv) 362, used for decrypting the segment keys stored in the segment key file.

In this manner, if the information processing apparatus successfully executes the SKB processing, the classification number (variant No.) 361 and the media key variable (Kmv) 362 are obtained, as indicated by pattern 1 in FIG. 8.

As in the MKB, the SKB is also sometimes updated by the management center to revoke specific devices and to disable the revoked devices from obtaining the information by the SKB processing.

A revoked information processing apparatus fails to obtain the classification number (variant No.) 361 and the media key variable (Kmv) 362 even if it attempts to process the designated row data by using the media key (Km) obtained by the MKB processing and the sequence key SK(c, r). This failure is confirmed by specific checking data. Then, it can be understood that it is not possible to obtain the classification number (variant No.) and the media key variable (Kmv) from that record.

Then, the information processing apparatus gives up obtaining information from the basic record, and executes processing on the extended record (1). The extended records have substantially the same data configuration as that of the basic record indicated in (b) in FIG. 8. The information processing apparatus selects the sequence key SK(c, r) corresponding to the column designated by the extended record (1), and executes processing on the row data of the extended record (1) corresponding to the row number (r) of the selected sequence key SK(c, r) by using the selected sequence key SK(c, r) and the media key (Km) obtained by the MKB processing.

If the processing on the row data has successfully been executed, the classification number (variant No.) 361 and the media key variable (Kmv) 362 has successfully been obtained, as indicated by pattern 1 in FIG. 8. If, however, the acquisition of the classification number (variant No.) 361 and the media key variable (Kmv) 362 has failed in the extended record (1), the processing is shifted to the subsequent extended record (2). In the processing of the extended record (2), the sequence key SK(c, r) corresponding to the column information designated by the extended record (2) is selected, and the row data of the extended record (2) corresponding to the row number (r) of the selected sequence key SK(c, r) is processed by using the selected sequence key SK(c, r) and the media key (Km) obtained by the MKB processing.

Thereafter, similarly, extended records are sequentially processed. During the execution of the processing, if the media key variable (Kmv) calculated from any record becomes 0, it is determined that the information processing apparatus is a revoked device and can no longer obtain effective information, i.e., the classification number (variant No.) and media key variable (Kmv), from the SKB. Unless the media key variable (Kmv) becomes 0, the processing can be shifted to the subsequent record.

As discussed above, a plurality of records are set in each SKB, and different columns are designated by the plurality of records so that the sequence keys to be used can be changed, thereby making it possible to revoke more restricted devices. More specifically, since one column corresponds to 256 rows (256 types) from 0 to 255, 1/256 of all user devices are selected as revoked devices. However, if 10 extended records are set, 11 steps (10 extended records and one basic record) are provided. With this configuration, only $1/256^{11}$ devices can be selected as revoked devices.

The sequence of the SKB processing executed by the information processing apparatus is discussed below with reference to FIG. 9. It is now assumed that the media key (Km) has successfully been obtained by the MKB processing before this processing. In step S101, the information processing apparatus obtains the column number from an SKB record, in this case, the basic record of the SKB.

Then, in step S102, on the basis of the obtained column number (c), the information processing apparatus selects the sequence key SK(c, r) corresponding to the column (c) from the sequence key file stored in the memory of the information processing apparatus. For example, the information processing apparatus obtains the sequence key SK(c, r) associated with the column number (c) designated by the basic record of the SKB from the sequence key file, such as that shown in FIG. 7.

Then, in step S103, the information processing apparatus calculates the media sequence key (Kms) from the media key (Km) obtained by the MKB processing and the sequence key SK(c, r). In step S104, the SKB variable (Dv) is calculated on the basis of the media sequence key (Kms), column and row numbers (c, r), and other values obtained from the SKB. The SKB variable (Dv) is calculated by preset computation processing.

In step S105, the information processing apparatus calculates the media key variable (Kmv) on the basis of the media key (Km) obtained by the MKB processing and the SKB variable (Dv). The media key variable (Kmv) is calculated by preset computation processing.

It is then determined in step S106 whether the calculated media key variable (Kmv) is 0, i.e., whether Kmv=0. If the media key variable (Kmv) is found to be 0, the process proceeds to step S111 in which the information processing apparatus determines that it has been revoked, and terminates the processing. In this case, the information processing apparatus can no longer obtain playlist selection information, such as the classification number (variant No.), and information, such as the media key variable (Kmv), used for decrypting the encrypted segment keys stored in the segment key file. Thus, the information processing apparatus terminates content playback processing.

If it is determined in step S106 that the calculated media key variable (Kmv) is not 0, the process proceeds to step S107. In step S107, the checking value (Dc) is calculated on the basis of the media key variable (Kmv) according to preset computation processing.

Then, in step S108, it is determined whether the checking value (Dc) indicates that the values obtained from the record are invalid. If the values obtained from the record are found to be invalid, the calculated checking value (Dc) contains specific code information (for example, DEADBEEF).

If it is found that the checking value (Dc) contains specific code information indicating that the values obtained from the record are invalid, the process proceeds to step S112 and shifts to the subsequent record (in this case, the extended record). Then, steps are started from step S101.

If it is determined in step S108 that the checking value (Dc) does not contain specific code information indicating that the values obtained from the record are invalid, the process proceeds to step S109. In step S109, it is determined that the media key variable (Kmv) is a valid media key variable (Kmv) and the classification number is obtained on the basis of the media key variable (Kmv). The classification number can be obtained from part of the bits forming the media key variable (Kmv).

In this manner, only authorized information processing apparatuses can obtain playlist selection information, such as the classification numbers (variant Nos.), and information, such as the media key variable (Kmv), used for decrypting the encrypted segment keys stored in the segment key file.

Both the MKB and SKB are set so that they can eliminate revoked devices, and, in this case, different revoking standards can be uniquely set for the MKB and the SKB.

As discussed above, an information recording medium stores therein content which is divided into a plurality of playback zones, and each playback zone includes segment portions, each being formed of a plurality of variation data obtained by encrypting the same playback data portion with different cryptographic keys. In the information recording medium, sequence key blocks (SKBs), which serve as blocks storing selection information for a plurality of playlists, set in association with a plurality of playback zones are also stored.

Each SKB is a block storing selection information (classification numbers (variant Nos.)) for a plurality of playlists associated with different playback paths, the playback path being determined in accordance with information processing apparatus.

Accordingly, each SKB stores therein information (classification numbers (variant Nos.)) for selecting a plurality of different playlists having play item sequences defined by different playback paths including variation data selected from each segment portion, the playback path being determined in accordance with the information processing apparatus. Each information processing apparatus can obtain information for selecting a playlist in accordance with a playback path including variation data selected from each segment portion. Additionally, each SKB includes information, i.e., the media key variable (Kmv), for generating a cryptographic key used for decrypting the content data in accordance with the playback path.

4. Content Playback Processing Basic Sequence in Information Processing Apparatus A content playback processing basic sequence in an information processing apparatus is described below with reference to FIGS. 10 and 11. Content stored in an information recording medium has segment portions and non-segment portions, as discussed with reference to FIGS. 3 and 4. The non-segment portions are handled by common processing, i.e., the non-segment portions are played back by the obtained unit key (Ku). On the other hand, for playing back the segment portions, the path used for selecting different segment data is determined depending on the information processing apparatus, and the segment data is selected and decrypted in accordance with the path.

Figure 10:
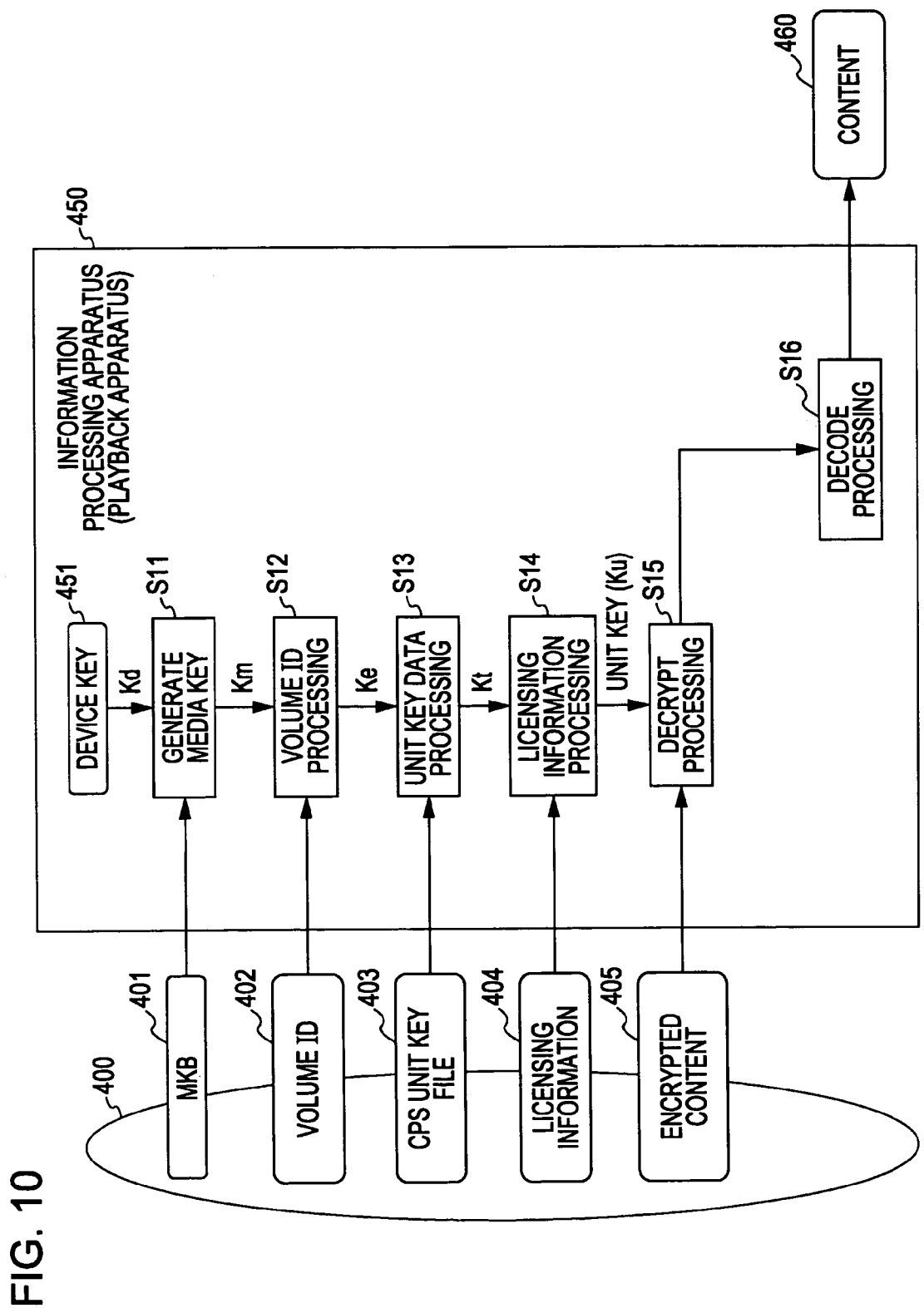
FIG. 10 illustrates a sequence of content playback processing executed by an information processing apparatus by using a content protection system (CPS) unit key.
Figure 11:
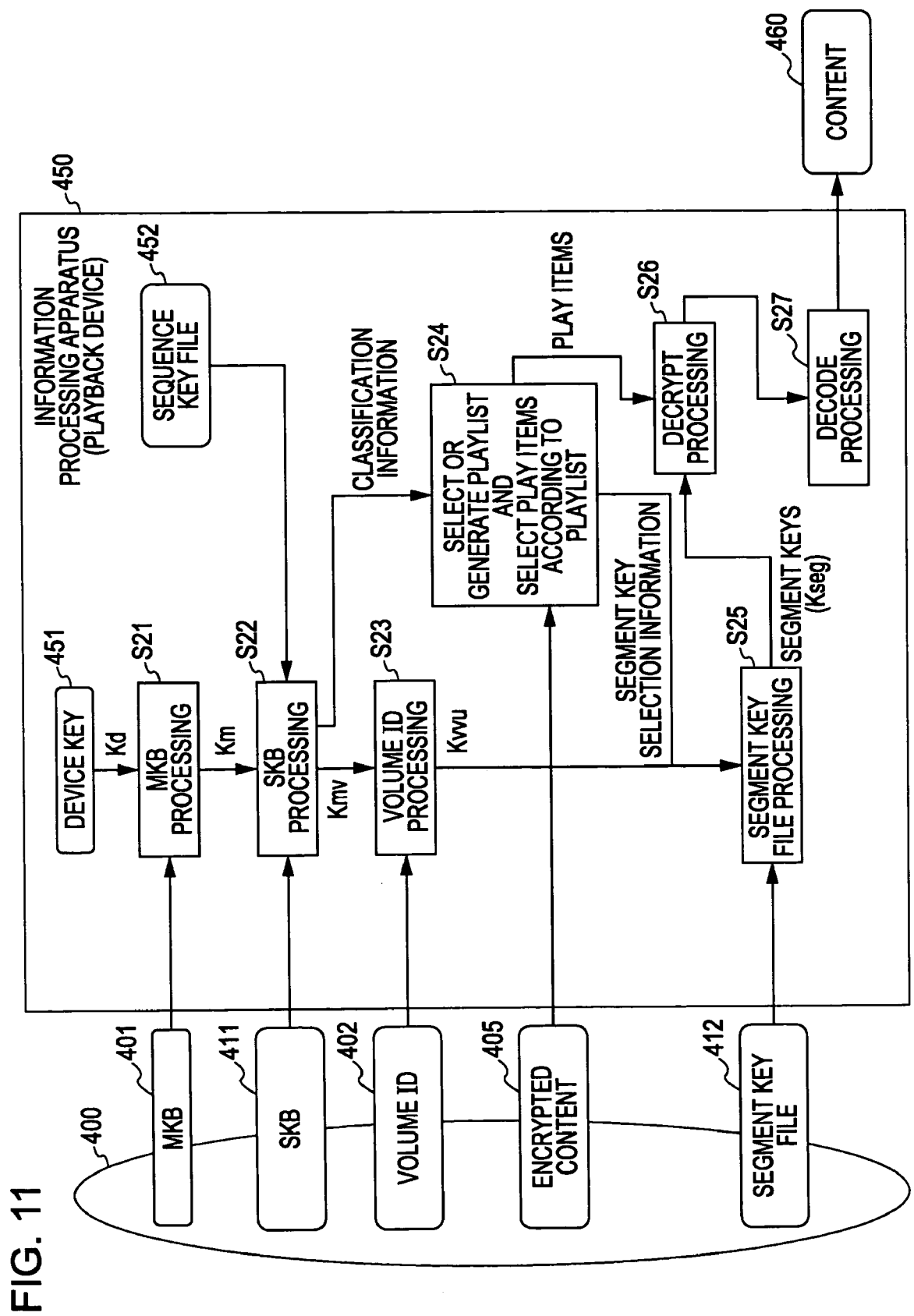
FIG. 11 illustrates a sequence of content playback processing executed by an information processing apparatus by using segment keys.

FIG. 10 illustrates playback processing performed by obtaining a unit key (Ku), and FIG. 11 illustrates a playback sequence for playing back segments, i.e., a playback sequence for decrypting segment data by obtaining segment keys (Kseg).

The playback sequence performed by obtaining the unit key (Ku) shown in FIG. 10 is first discussed. An information processing apparatus 450 reads various information from an information recording medium 400, and decrypts encrypted content on the basis of a unit key (Ku) generated by key generation processing performed by using the read data and a device key (Kd) 451 owned by the information processing apparatus 450.

The information processing apparatus 450 first reads the device key (Kd) 451 stored in the memory. The device key 451 is a private key stored in the information processing apparatus 450 which has a license concerning the content usage.

Then, in step S11, by using the device key 451, the information processing apparatus 450 decrypts an MKB 401, which is a cryptographic key block storing the media key Km therein, stored in the information recording medium 400, thereby obtaining the media key Km.

Then, in step S12, the information processing apparatus 450 performs encrypt processing based on the media key Km obtained in the MKB processing in step S11 and a volume ID 402 read from the information recording medium 400, thereby generating a title-key generating key Ke (embedded Key). This key generating processing is executed on the basis of, for example, an advanced encryption standard (AES) encryption algorithm.

Then, in step S13, based on the title-key generating key Ke (embedded key) and the encrypted CPS unit key obtained from a CPS unit key file 403 read from the information recording medium 400, unit key data processing, for example, encrypt processing (AES_H), is executed to obtain the title key Kt.

Then, in step S14, the unit key Ku is generated by encrypt processing (AES_H) on the basis of the title key Kt and licensing information 404 read from the information recording medium 400. In step S15, decrypt processing (for example, AES_D) using the unit key Ku is executed on the encrypted content read from the information recording medium 400.

Then, in step S16, necessary decode processing, such as MPEG-decoding, decompression, and descrambling, is executed so that content 460 can be obtained.

The decrypt processing sequence for non-segment data, which is other than segment portions, has been discussed. In an information recording medium, content without segment portions having a plurality of variations discussed with reference to FIGS. 3 and 4, i.e., content having only non-segments portions, may be included. Such content can be decrypted and played back with the unit key generated in the process as shown in FIG. 10.

For content including segment portions having a plurality of variations discussed with reference to FIGS. 3 and 4, segment keys are generated according to the sequence shown in FIG. 11.

In FIG. 11, the information processing apparatus 450 reads the device key (Kd) 451 stored in the memory. The device key 451 is a private key stored in the information processing apparatus which has a license concerning the content usage.

Then, in step S21, by using the device key 451, the information processing apparatus 450 decrypts the MKB 401, which is a cryptographic key block storing the media key Km therein, stored in the information recording medium 400, thereby obtaining the media key Km.

Then, in step S22, by processing an SKB 411 read from the information recording medium 400, the classification number (variant No.), which serves as playlist selection information, and the media key variable (Kmv) used for obtaining the encrypted segment keys stored in the segment key file are obtained.

Step S22 is the processing discussed with reference to the flowchart in FIG. 9, and is executed on the basis of the sequence key SK(c, r) obtained from a sequence key file 452 and the media key (Km) obtained from the MKB 401.

Subsequently, in step S23, a volume variant unique key (Kvvu) is obtained by encryption processing or computation processing of the volume ID 402 read from the information recording medium 400 and the media key variable (Kmv) obtained from the SKB 411 in step S22. The volume variant unique key (Kvvu) is a cryptographic key used for decrypting the encrypted segment keys corresponding to the specific playback path stored in a segment key file 412.

In the segment key file 412, a set of segment keys encrypted with different volume variant unique keys (Kvvu) in accordance with specific playback paths are stored. Each information processing apparatus obtains the volume variant unique key (Kvvu) corresponding to the specific playback path, and can decrypt only segment keys used for decrypting the segment data contained in the play items defined by the playback path.

In step S24, the information processing apparatus 450 selects the playlist including the play item sequence to be played back from the encrypted content 405 recorded on the information recording medium 400 on the basis of the classification number (variant No.) obtained in the SKB processing in step S22. As discussed with reference to FIG. 2, the encrypted content 405 includes many playlists, and the information processing apparatus 450 selects the playlist including the play item sequence to be played back on the basis of the classification number (variant No.) obtained from the SKB 411.

In step S25, the segment key file 412 is processed by using the volume variant unique key (Kvvu) so that the segment keys (Kseg) corresponding to the specific playback path can be obtained.

It is necessary that the information processing apparatus 450 obtain from the segment key file 412 the segment keys Kseg used for decrypting the play items corresponding to the specific playback path. As the information for selecting the segment keys Kseg, the playlist ID and the play item IDs associated with the play items to be played back are used. The information processing apparatus 450 searches for the data stored in the segment key file 412 on the basis of the playlist ID and play item IDs. As stated above, IDs are assigned to all playlists and all play items as identification information. Meanwhile, in the segment key file storing encrypted segment keys associated with various playback paths, the segment keys are stored as cryptographic key data corresponding to the playlist IDs and play items IDs so that the association between the segment keys with the playlists and play items can be identified.

In step S25, the information processing apparatus 450 searches for the data stored in the segment key file 412 on the basis of the playlist ID and play item IDs associated with the play items to be played back to select the encrypted segment key data corresponding to the play items. Then, the information processing apparatus 450 decrypts the encrypted segment key data by using the volume variant unique key (Kvvu) to obtain the segment keys (Kseg) corresponding to the specific playback path.

Then, in step S26, the information processing apparatus 450 decrypts the segment data by using the segment keys (Kseg) to play back the content. As discussed with reference to FIG. 4, each segment data to be selected includes one of variation numbers 0 to 15 as defined by the specific playback path. The segment data is automatically selected by the playlist.

That is, the playlist includes a play item sequence to be played back, and by selecting the play items set in the selected playlist, the data in accordance with the specific playback path can be sequentially selected. The relationship between the playlist and play items is described below with reference to FIG. 12.

Figure 12:
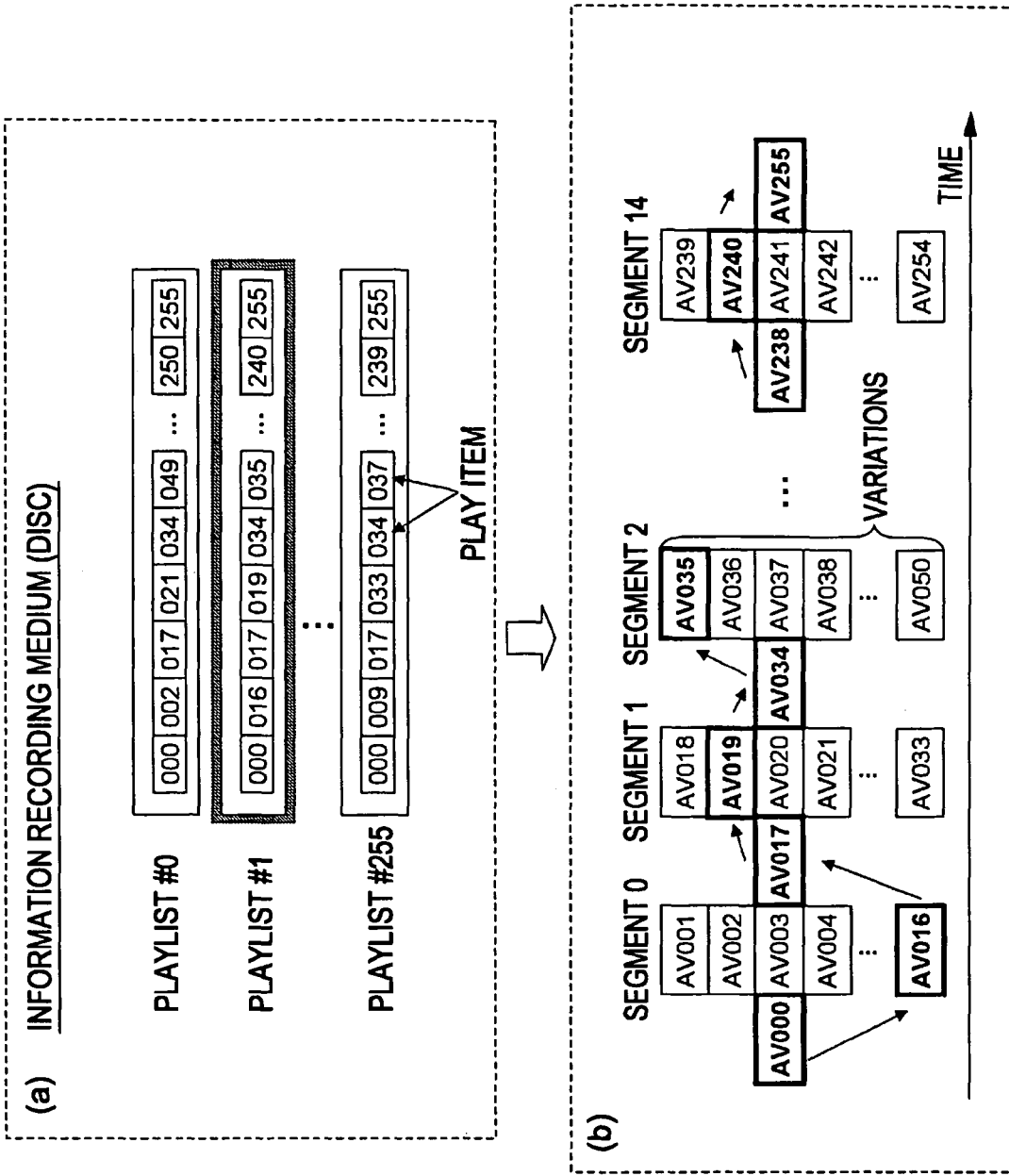
FIG. 12 illustrates the relationship between a playlist and play items.

Examples of various playlists stored in an information recording medium are shown in (a) in FIG. 12. Those playlists include different playback paths that are applicable to the same content playback zone data corresponding to one SKB. As stated above, 256 (#0 through #255) playlists are set for one SKB.

For example, playlist #1 defines a play item sequence including play items [000], [016], [017], and so on. The information processing apparatus plays back content according to the play item sequence [000], [016], [017], and so on, which are set in the playlist #1.

According to this content playback processing, play items [AVxxx] can be sequentially played back, as indicated in (b) in FIG. 12. In each segment portion, one of a plurality of variation data is selected and played back.

Referring back to the sequence diagram shown in FIG. 11, in step S26, play items are obtained in accordance with the playback path defined by the playlist selected in step S25, and in each segment portion, the segment data is decrypted with the generated segment key Kseg.

In step S27, necessary decode processing, such as MPEG-decoding, decompression, and descrambling, is executed so that content 460 can be obtained. The decryption processing sequence on the segment data has been discussed.

Content stored in an information recording medium includes segment portions and non-segment portions. An information processing apparatus decrypts the non-segment portions by using the unit key (Ku), and decrypts the segment portions by using segment keys. Accordingly, to play back content including segment portions, the information processing apparatus performs combined processing including the processing sequence shown in FIG. 10 and the processing sequence shown in FIG. 11.

5. Content Playback Processing Using Plurality of Playlists

As discussed above, content is divided into a plurality of (n) playback zones corresponding to a plurality of SKBs (SKB1 through SKBn), and then, the content is played back by sequentially applying a plurality of (n) playlists selected on the basis of classification numbers obtained from the SKBs. In this case, if it takes time to switch playlists, it may be difficult to play back content seamlessly. To avoid such a situation and to implement a seamless playback operation on the content, the following configuration is discussed below.

The following two examples of content playback processing using a plurality of playlists are sequentially discussed below:

(1) Playback Processing by Execution of Playlist Integrating Processing Program (2) Playback Processing by Execution of Movie Object Commands.

(1) Playback Processing by Execution of Playlist Integrating Processing Program

The playback processing by the execution of a playlist integrating processing program is discussed first. In an information recording medium 500, as shown in FIG. 13, a sequence key block (SKB) set 501 including a plurality of sequence key blocks (SKB1 through SKBn) is stored.

A classification number, which serves as playlist specifying information, is obtained from each of the sequence key blocks (SKB1 through SKBn) forming the sequence key block (SKB) set 501. The information processing apparatus then plays back content by sequentially applying the plurality of playlists. That is, it is necessary to switch playlists when playing back content.

In this processing, to play back content without the need to switch playlists, a plurality of playlists are obtained beforehand on the basis of the classification numbers determined from the plurality of corresponding sequence key blocks (SKB1 through SKBn), and the obtained plurality of playlists are integrated into a new playlist.

Figure 13:
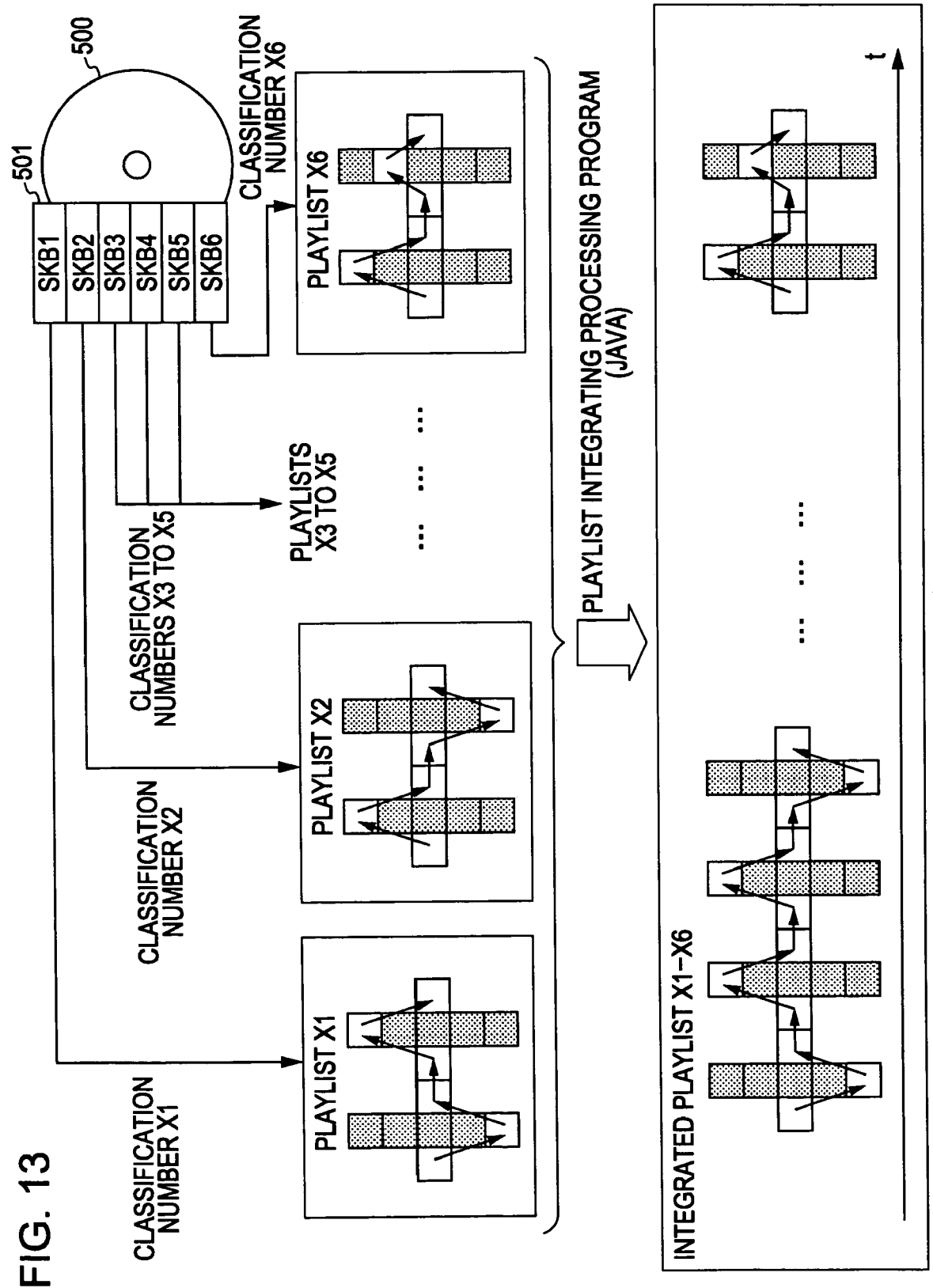
FIG. 13 illustrates processing for integrating a plurality of playlists on the basis of a playlist integrating processing program.

If the information recording medium 500 stores 6 sequence key blocks (SKB1 through SKB6), as shown in FIG. 13, the information processing apparatus first obtains the classification number from each of the sequence key blocks (SKB1 through SKB6). This processing is executed in accordance with the SKB processing discussed with reference to FIG. 9.

Then, playlists are obtained on the basis of the classification numbers corresponding to the sequence key blocks (SKB1 through SKB6). In the example shown in FIG. 13, 6 playlists, i.e., playlists X1 through X6, are obtained.

Then, a single integrated playlist (integrated playlist X1 through X6) is generated by applying a playlist integrating processing program, for example, the JAVA (registered) program. Each playlist includes, as discussed with reference to FIG. 12, a play item sequence, and the playlist integrating processing program generates a new playlist by setting the play items contained in the plurality of playlists as one sequence. As the attribute information concerning the integrated playlist, a plurality of playlist IDs associated with the plurality of corresponding playlists are set.

The reason for this is as follows. When selecting segment keys from the segment key file in accordance with a specific path, it is necessary to search for the segment keys by using playlist IDs and play item IDs as indexes. The attribute information concerning the integrated playlist includes a plurality of playlist IDs associated with the plurality of corresponding playlists, and information concerning the range of play items contained in each playlist before being integrated.

In content playback processing, the play items set in the integrated playlist X1 through X6 are sequentially obtained, decrypted, and played back. The application of the integrated playlist eliminates the need to switch playlists while playing back content, thereby implementing the seamless content playback operation.

The integrated playlist X1 through X6 generated by using the playlist integrating processing program is set as playlist files in a directory which is set in a virtual file system generated in accordance with content playback processing and used for the content playback processing. When playing back content, the playlist files (integrated playlist) set in the virtual file system are used.

The playlist integrating processing program may be stored beforehand in an information recording medium in which content is stored, or may be stored in an information processing apparatus to play back content.

Figure 14:
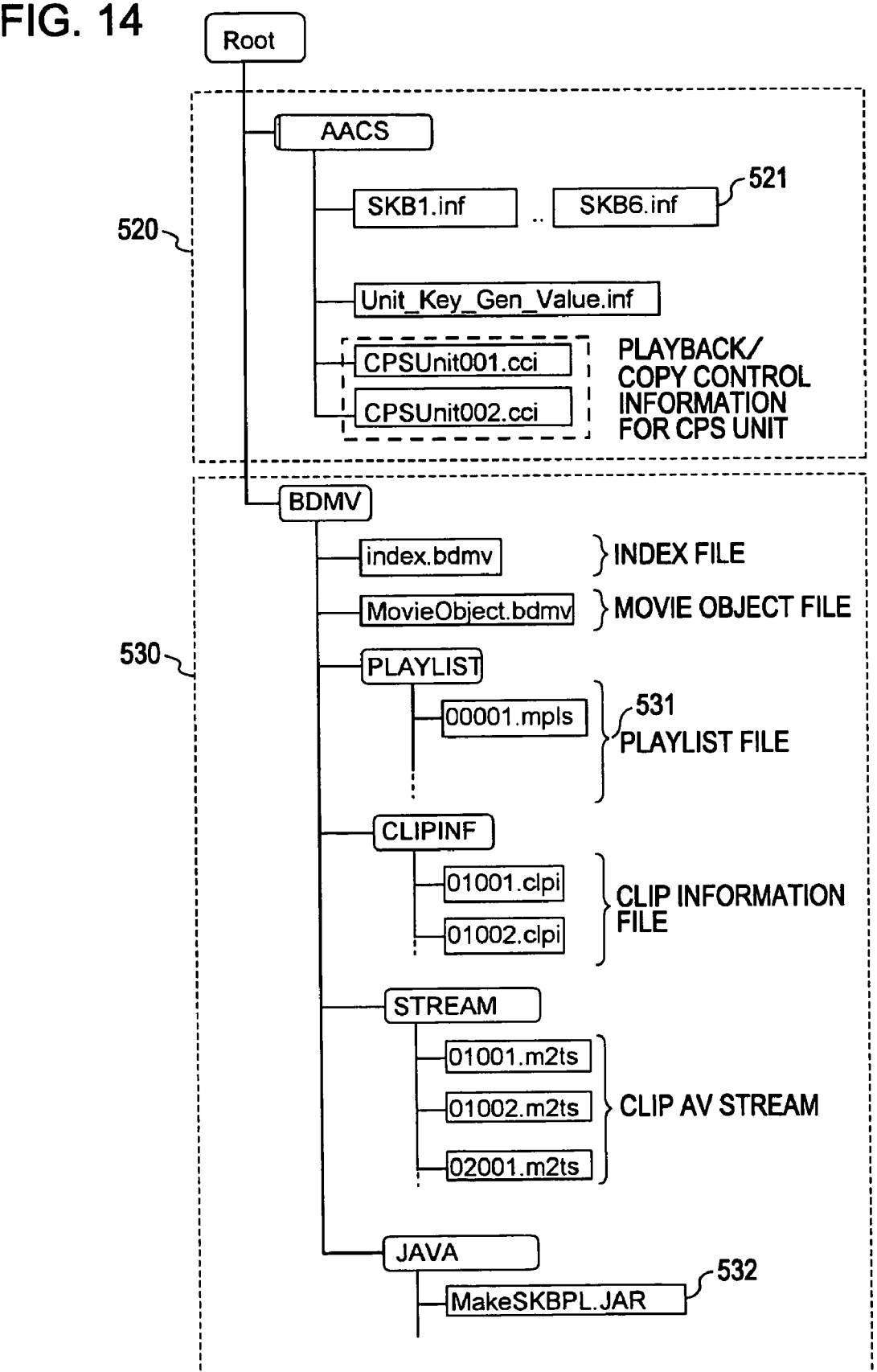
FIG. 14 illustrates the configuration of a directory in which a plurality of SKBs and a playlist integrating processing program are stored.

An example of the directory configuration when the playlist integrating processing program is stored in an information recording medium is shown in FIG. 14. The directory is divided into a management information setting portion 520 and a data portion 530. A plurality of sequence key blocks (SKB1 through SKBn) 521 are stored in the management information setting portion 520.

In the data portion 530, data and programs (index files, movie object files, playlist files, clip information files, and AV streams) having a hierarchical structure, such as that shown in FIG. 2, are stored. In a program storage portion, a playlist integrating processing program 532 (for example, the Java (registered) program) is set.

Playlist files 531 include a plurality of playlists that are selected on the basis of the classification numbers obtained from the SKBs and that correspond to playback zone data divided from one piece of content.

When playing back content, the information processing apparatus reads the playlist integrating processing program 532 and obtains the playlists corresponding to the plurality of playback zone data selected on the basis of the classification numbers obtained from the plurality of SKBs, and then integrates the playlists into a new playlist.

A content playback application installed in the information processing apparatus executes content payback processing by using the playlists in the directory set in the virtual file system.

As shown in FIG. 15, a content playback application 540 selects data files and program files required for playing back content from an information recording medium 541 on which various data files 542, such as content, are recorded. Meanwhile, the content playback application 540 selects an integrated playlist X1 through X6 544 generated and temporarily recorded on a local storage 543 of the information recording medium 541 and sets one virtual file system 550. The content playback application 540 then plays back content by performing data processing on the basis of the virtual file system 550. The use of a virtual directory makes it possible to implement fast access to the files stored in different recording media.

The content playback application 540 shown in FIG. 15 is an application program, such as a movie object, executed in the information processing apparatus. The content playback application 540 can handle files recorded on the information recording medium 541 or files recorded on the local storage 543 via the virtual file system 550. Accordingly, the virtual file system 550 has the function of absorbing the differences in recording media (file systems). Thus, the content playback application 540 can handle files recorded on recording media by using the same application program interface (API) without the need to being aware of the differences in the recording media on which files are stored.

The content playback processing sequence in this example is described below with reference to the flowchart in FIG. 16. In step S201, an information processing apparatus first processes an MKB read from an information recording medium by using the device key (Kd) stored in the memory of the information processing apparatus. It is then determined in step S202 whether the media key (Km) has been successfully obtained from the MKB. Unless the information processing apparatus is a revoked device, it can obtain the media key (Km) from the MKB. If it is determined in step S202 that the media key (Km) has not been successfully obtained from the MKB, it means that the information processing apparatus is a revoked device, and the process proceeds to step S221. In step S221, the information processing apparatus is prohibited from continuing to perform playback processing and playback processing is terminated.

If it is determined in step S202 that the media key (Km) has successfully been obtained, the process proceeds to step S203 to determine whether the content to be played back requires sequence key blocks (SKBs). Information concerning whether the content to be played back requires SKBs can be extracted from recording information of the CPS unit key file corresponding to the content to be played back.

If it is found in step S203 that the content to be played back does not require SKBs, it means that all the content data can be played back by being decrypted by the CPS unit key, and the process proceeds to step S222 in which the content is played back by the CPS unit key. This processing is equivalent to the processing discussed with reference to FIG. 10.

If it is determined in step S203 that the content to be played back requires SKBs, the process proceeds to step S204. In step S204, the information processing apparatus obtains a plurality of SKBs from the information recording medium and executes processing on each SKB. The SKB processing is equivalent to the processing discussed with reference to FIG. 9, and is executed on the basis of the sequence key SK(c, r) obtained from the sequence key file stored in the memory of the information processing apparatus and the media key (Km) obtained from the MKB.

It is then determined in step S205 whether a plurality of (n) media key variables (Kmv) have successfully been obtained. If the acquisition of the plurality of (n) media key variables (Kmv) has failed, it means that the information processing apparatus has been revoked, and the process proceeds to step S221. The information processing apparatus is then prohibited from continuing to perform playback processing, and the playback processing is then terminated.

Figure 9:
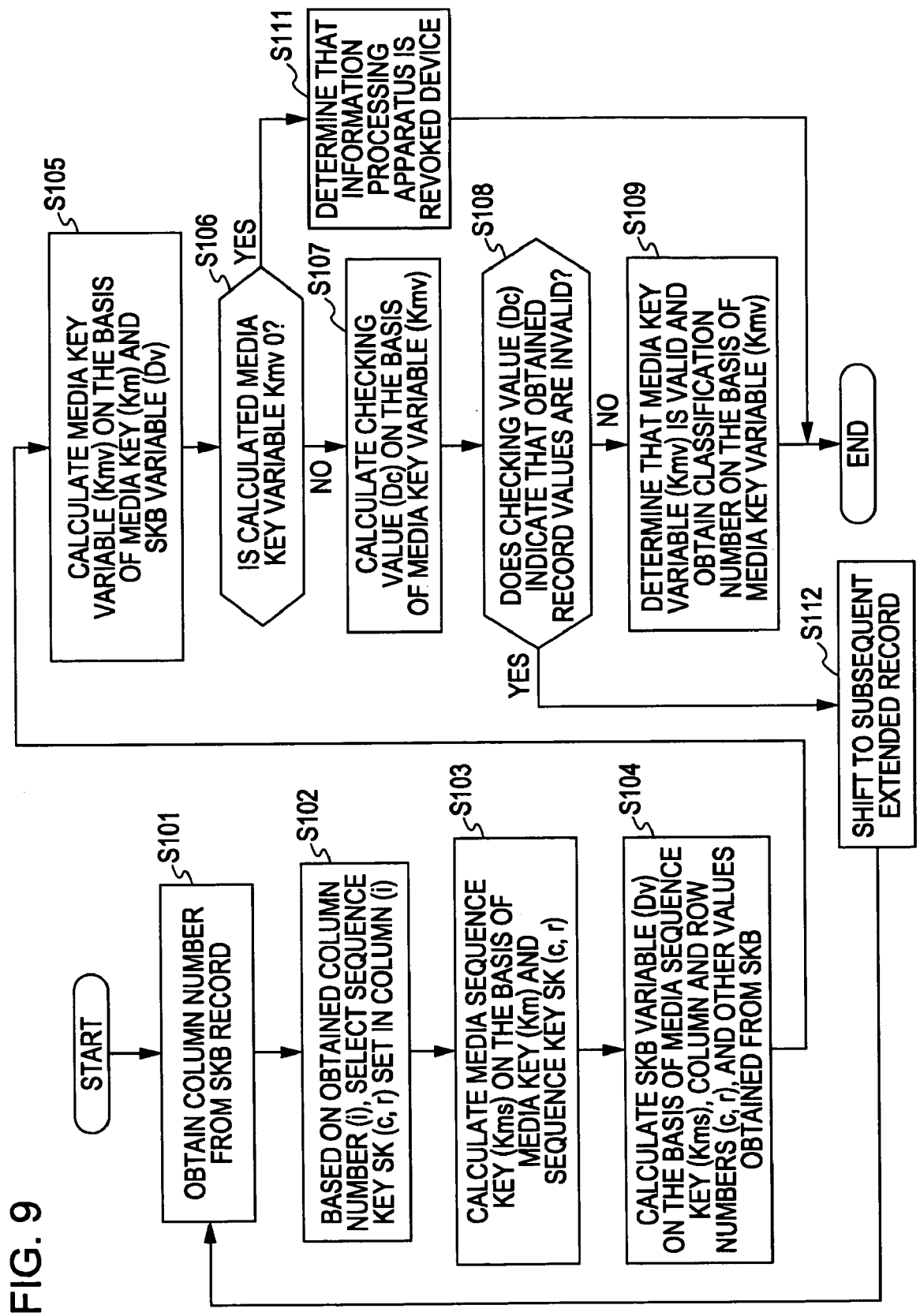
FIG. 9 is a flowchart illustrating a sequence of SKB processing executed by an information processing apparatus.

If it is determined in step S205 that the acquisition of a plurality of (n) media key variables has succeeded, the process proceeds to step S206 in which a plurality of (n) classification numbers are obtained by performing the SKB processing shown in FIG. 9. As has been discussed, the classification numbers can be obtained from part of bits forming the media key variables (Kmv).

Then, in step S207, n playlists are selected on the basis of the plurality of (n) classification numbers. As stated above, the classification numbers obtained from the SKBs are used as playlist selection information, and n playlists are selected on the basis of the plurality of (n) classification numbers.

Then, in step S208, playlist editing processing is executed on the basis of a playlist integrating processing program. As discussed with reference to FIG. 13, the playlist editing processing is to integrate a plurality of playlists corresponding to the classification numbers obtained from a plurality of SKBs into one playlist, and is executed on the basis of a playlist integrating processing program, for example, JAVA (registered).

Then, in step S209, the playback operation on play items set in the integrated playlist is sequentially started. In step S210, the information processing apparatus searches for data stored in the segment key file on the basis of the playlist ID and play item ID associated with a play item to be played back. As stated above, IDs are assigned to all playlists and all play items as identification information. Meanwhile, in the segment key file storing encrypted segment keys associated with various playback paths, the segment keys are stored as cryptographic key data corresponding to the playlist IDs and play items IDs so that the association between the segment keys with the playlists and play items can be identified.

It is then determined in step S211 whether segment key data corresponding to the playlist ID and play item ID associated with the play item to be played back has been detected. If corresponding segment key data has not been detected in step S211, it means that the play item to be played back is a play item having non-segment data, i.e., a play item without a plurality of variation data, and the process proceeds to step S212 in which a CPS unit key is generated. Then, in step S214, the play item is decrypted and played back by using the CPS unit key.

If it is determined in step S211 that segment key data corresponding to the playlist ID and play item ID associated with the play item has been detected, it means that the play item is a play item including segment portions having a plurality of variation data, and the process proceeds to step S213 in which segment keys are generated. Then, in step S214, the play item is decrypted and played back by using the segment keys.

As discussed above, in step S213, the segment keys can be generated as follows. The segment key data corresponding to the playlist ID and play items ID is obtained from the segment key file. That is, the encrypted segment key data corresponding to the play item to be played back is decrypted by using the volume variant unique key (Kvvu) so that the segment keys (Kseg) corresponding to the specific playback path can be obtained.

It is then determined in step S215 whether all play items set in the integrated playlist have been played back. If there is any play item that has not been played back, the process returns to step S209, and the processing is similarly repeated. If it is determined in step S215 that all the play items set in the integrated playlist have been played back, the content playback processing is completed.

In the above-described content playback processing, SKB processing is finished before starting the content playback processing. Then, a plurality of playlists are obtained on the basis of the classification numbers calculated from the plurality of SKBs, and are integrated into a single playlist. Playback processing is then executed on the basis of the integrated playlist. With this configuration, play items can be selected, decrypted, and played back in accordance with the play item sequence set in the integrated playlist, which eliminates the need to switch playlists, thereby implementing seamless content playback processing.

Figure 16:
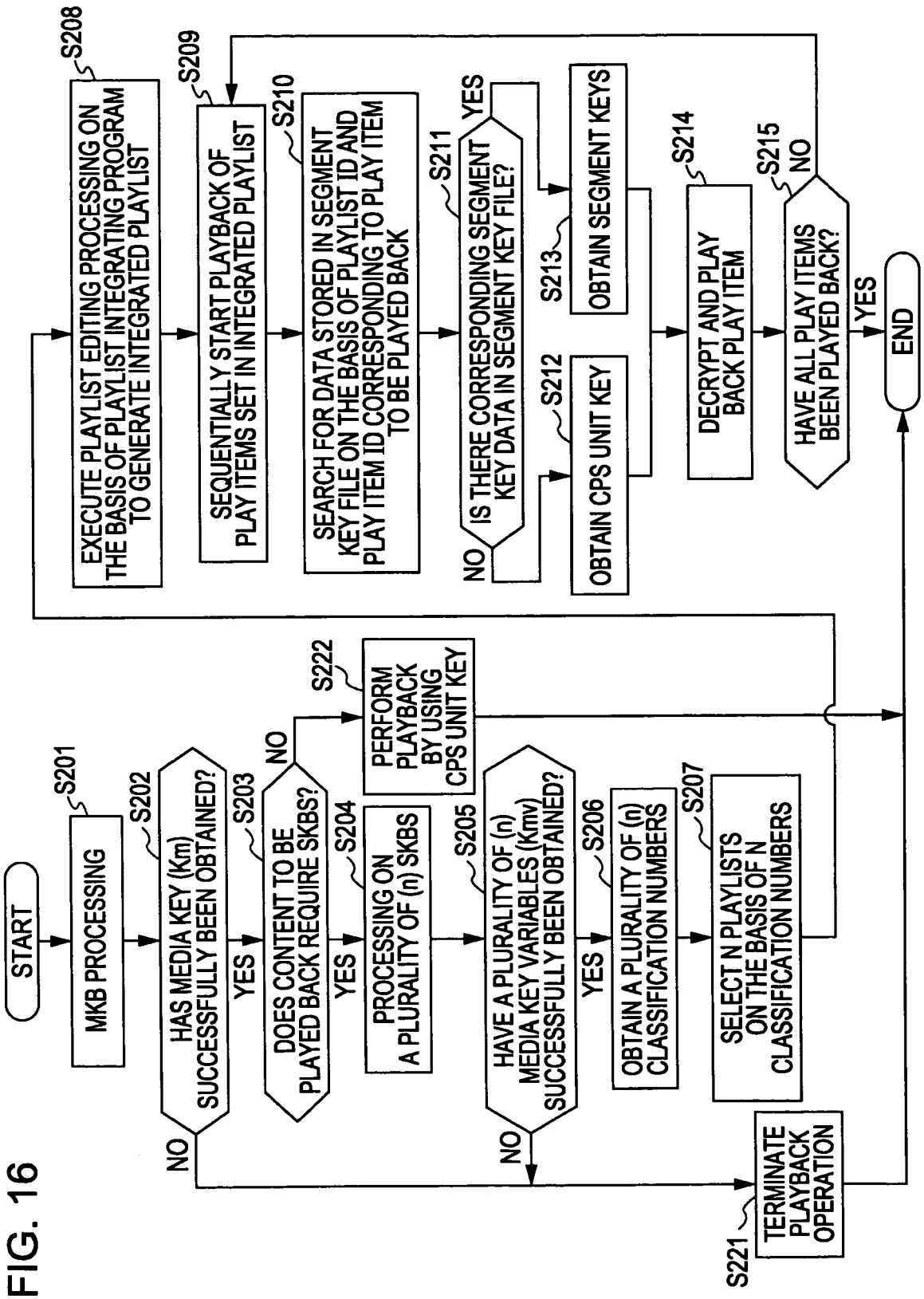
FIG. 16 is a flowchart illustrating content playback processing including playlist integrating processing executed on the basis of a playlist integrating processing program.

FIG. 17 illustrates the functions of an information processing apparatus that executes the playback processing shown in FIG. 16. More specifically, FIG. 17 is a block diagram illustrating the functions of an information processing apparatus that performs content playback on the basis of a single integrated playlist. The information processing apparatus includes a playlist selection information obtaining unit 611, a playlist selector 612, a playlist integrating processor 613, and a content playback unit 614.

In an information recording medium 600, content including a plurality of divided playback zones to which playlists are assigned, such as the content discussed with reference to FIG. 3, is stored. The playlist selection information obtaining unit 611 obtains classification numbers (variant Nos.), which serve as playlist selection information, from the sequence key blocks (SKBs). The playlist includes information concerning a playback sequence of play items, which are set as content playback unit data. That is, the playlist selection information obtaining unit 611 obtains a plurality of classification numbers X1 through Xn from the plurality of SKBs.

The playlist selector 612 obtains a plurality of playlists X1 through Xn on the basis of the plurality of classification numbers X1 through Xn obtained from the SKBs by the playlist selection information obtaining unit 611. As stated above, the classification numbers are used as identification information concerning the playlists.

The playlist integrating processor 613 integrates the plurality of playlists selected by the playlist selector 612 into an integrated playlist X1 through Xn in which playback sequence information concerning play items contained in the plurality of playlists is set as one play item sequence. The content playback unit 614 plays back content on the basis of the integrated playlist.

The playlist selection information obtaining unit 611 selects, from each SKB in accordance with the corresponding content playback zone, a classification number, which serves as playlist selection information concerning the playlist having a play item sequence defined by the playback path and containing variation data selected from each segment portion. The classification number can be obtained in accordance with the SKB processing discussed with reference to FIG. 9 by using the media key (Km) obtained from the MKB and the sequence key SK(c, r).

The content playback unit 614 obtains the play items designated by the integrated playlist generated by the playlist integrating processor 613 by using a virtual file system that can be accessed by the integrated playlist, and then plays back content. The specific playback processing can be indicated by the flowchart shown in FIG. 16 and the processing sequence diagrams shown in FIGS. 10 and 11.

(2) Playback Processing by Execution of Movie Object Commands

The playback processing by the execution of movie object commands is now described. As discussed with reference to FIG. 2, a movie object, which serves as a playback processing program, is set in content stored in an information recording medium, and the movie object specifies a playlist, and content is played back in accordance with the play items contained in the specified playlist.

In the following example, content is played back by speedily switching playlists selected in accordance with classification numbers calculated from a plurality of (for example, 6) SKBs by using commands output from a movie object. To reduce the time for switching the playlists, the classification numbers are calculated from the SKBs before starting to play back content, for example, when a disc is inserted, and the calculated classification numbers are set in a register of the information processing apparatus.

When playing back content, the information processing apparatus sequentially obtains the classification numbers that are set in the register, and selects the playlists on the basis of the obtained classification numbers. This eliminates the need to execute SKB processing when playing back content, thereby achieving efficient playlist switching.

As shown in FIG. 18, the information processing apparatus calculates classification numbers (X1 through X6) from the corresponding SKBs forming a sequence key block (SKB) set 501 stored in the information recording medium 500 before starting to play back content, for example, when a disc is inserted, and sets the calculated classification numbers (X1 through X6) in a register 570 of the information processing apparatus.

When playing back content, the classification numbers (X1 through X6) set in the register 570 are sequentially obtained, and the playlists are sequentially selected on the basis of the obtained classification numbers. This processing eliminates the need to execute SKB processing when playing back content, and playlists can be efficiently switched.

The processing for obtaining the classification numbers (variant Nos.) from the register and for sequentially playing back the playlists having the playlist IDs corresponding to the classification numbers is performed by the execution of movie object commands. An example of the movie object commands is shown in FIG. 19A.

The movie object commands shown in FIG. 19A obtain the classification numbers (variant Nos.) set in player status registers (PSRs) and sequentially play back playlists having the playlist IDs corresponding to the obtained classification numbers (variant Nos.).

By executing those commands, the efficient switching of playlists can be implemented. As a result, as shown in FIG. 19B, play items positioned at the connecting portions of a plurality of different playlists X1, X2, and so on, can be seamlessly played back.

Figure 20:
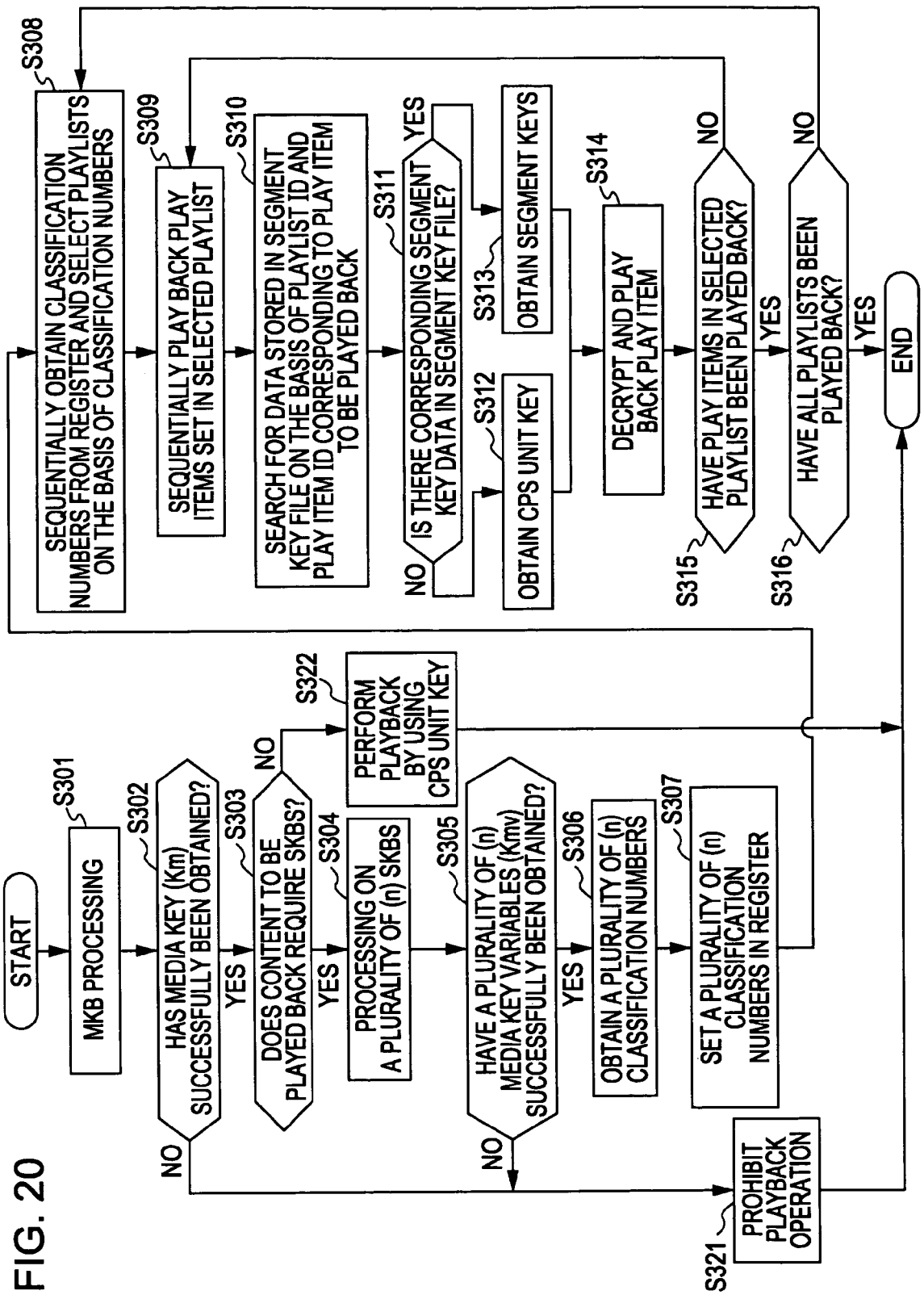
FIG. 20 is a flowchart illustrating a sequence of processing for playing back content by setting classification numbers obtained from a plurality of SKBs in a register and by selecting and switching playlists on the basis of the classification numbers.

The content playback processing sequence in this example is described below with reference to the flowchart in FIG. 20. In step S301, an information processing apparatus first processes an MKB read from an information recording medium by using the device key (Kd) stored in the memory of the information processing apparatus. It is then determined in step S302 whether the media key (Km) has been successfully obtained from the MKB. Unless the information processing apparatus is a revoked device, it can obtain the media key (Km) from the MKB. If it is determined in step S302 that the media key (Km) has not successfully been obtained from the MKB, it means that the information processing apparatus is a revoked device, and the process proceeds to step S321. In step S321, the information processing apparatus is prohibited from continuing to perform playback processing and playback processing is terminated.

If it is determined in step S302 that the media key (Km) has successfully been obtained, the process proceeds to step S303 to determine whether the content to be played back requires sequence key blocks (SKBs). Information concerning whether the content to be played back requires SKBs can be extracted from recording information of the CPS unit key file corresponding to the content to be played back.

If it is found in step S303 that the content to be played back does not require SKBs, it means that all the content data can be played back by being decrypted by the CPS unit key, and the process proceeds to step S322 in which the content is played back by the CPS unit key. This processing is equivalent to the processing discussed with reference to FIG. 10.

If it is determined in step S303 that the content to be played back require SKBs, the process proceeds to step S304. In step S304, the information processing apparatus obtains a plurality of SKBs from the information recording medium and executes processing on each SKB. The SKB processing is equivalent to the processing discussed with reference to FIG. 9, and is executed on the basis of the sequence key SK(c, r) obtained from the sequence key file stored in the memory of the information processing apparatus and the media key (Km) obtained from the MKB.

It is then determined in step S305 whether a plurality of (n) media key variables (Kmv) have successfully been obtained. If the acquisition of the plurality of (n) media key variables (Kmv) has failed, it means that the information processing apparatus has been revoked, and the process proceeds to step S321. The information processing apparatus is then prohibited from continuing to perform playback processing, and the playback processing is then terminated.

If it is determined in step S305 that the acquisition of a plurality of (n) media key variables has succeeded, the process proceeds to step S306 in which a plurality of (n) classification numbers are obtained by performing the SKB processing shown in FIG. 9. As discussed, the classification numbers can be obtained from part of bits forming the media key variables (Kmv).

Then, in step S307, a plurality of (n) classification numbers are set (stored) in a register. As stated above, the classification numbers obtained from the SKBs are used as playlist selection information, and n playlists can be selected on the basis of the n classification numbers.

Then, in step S308, the classification numbers are sequentially obtained from the register, and a playlist is selected on the basis of one of the classification numbers. In step S309, the play items set in the selected playlist are sequentially played back.

In step S310, the information processing apparatus searches for data stored in the segment key file on the basis of the playlist ID and play item ID associated with a play item to be played back. As stated above, IDs are assigned to all playlists and all play items as identification information. Meanwhile, in the segment key file storing encrypted segment keys associated with various playback paths, the segment keys are stored as cryptographic key data corresponding to the playlist IDs and play items IDs so that the association between the segment keys with the playlists and play items can be identified.

It is then determined in step S311 whether segment key data corresponding to the playlist ID and play item ID associated with the play item to be played back has been detected. If corresponding segment key data has not been detected in step S311, it means that the play item to be played back is a play item having non-segment data, i.e., a play item without a plurality of variation data, and the process proceeds to step S312 in which a CPS unit key is generated. Then, in step S314, the play item is decrypted and played back by using the CPS unit key.

If it is determined in step S311 that segment key data corresponding to the playlist ID and play item ID associated with the play item has been detected, it means that the play item is a play item including segment portions having a plurality of variation data, and the process proceeds to step S313 in which segment keys are generated. Then, in step S314, the play item is decrypted and played back by using the segment keys.

In step S313, the segment keys can be generated as follows. The segment key data corresponding to the playlist ID and play items ID is obtained from the segment key file. That is, the encrypted segment key data corresponding to the play item to be played back is decrypted by using the volume variant unique key (Kvvu) so that the segment keys (Kseg) corresponding to the specific playback path can be obtained.

It is then determined in step S315 whether all play items set in the selected playlist have been played back. If there is any play item that has not been played back, the process returns to step S309, and the processing is similarly repeated.

If it is determined in step S315 that all the play items set in the selected playlist have been played back, the process proceeds to step S316 to determine whether all playlists corresponding to the content have been played back. If there is any playlist that has not been played back, the process returns to step S308, and the processing is similarly repeated. If it is determined in step S316 that all the playlists have been played back, the content playback processing is completed.

In the above-described content playback processing, SKB processing is finished before starting the content playback processing. Then, classification numbers calculated on the basis of the plurality of SKBs are set in a register, and playlists are selected on the basis of the classification numbers that are set in the register. With this configuration, playlists can be switched by the execution of commands of a movie object, which serves as a playback processing program. Thus, the seamless content playback operation can be implemented without the need for the time to switch playlists.

Figure 21:
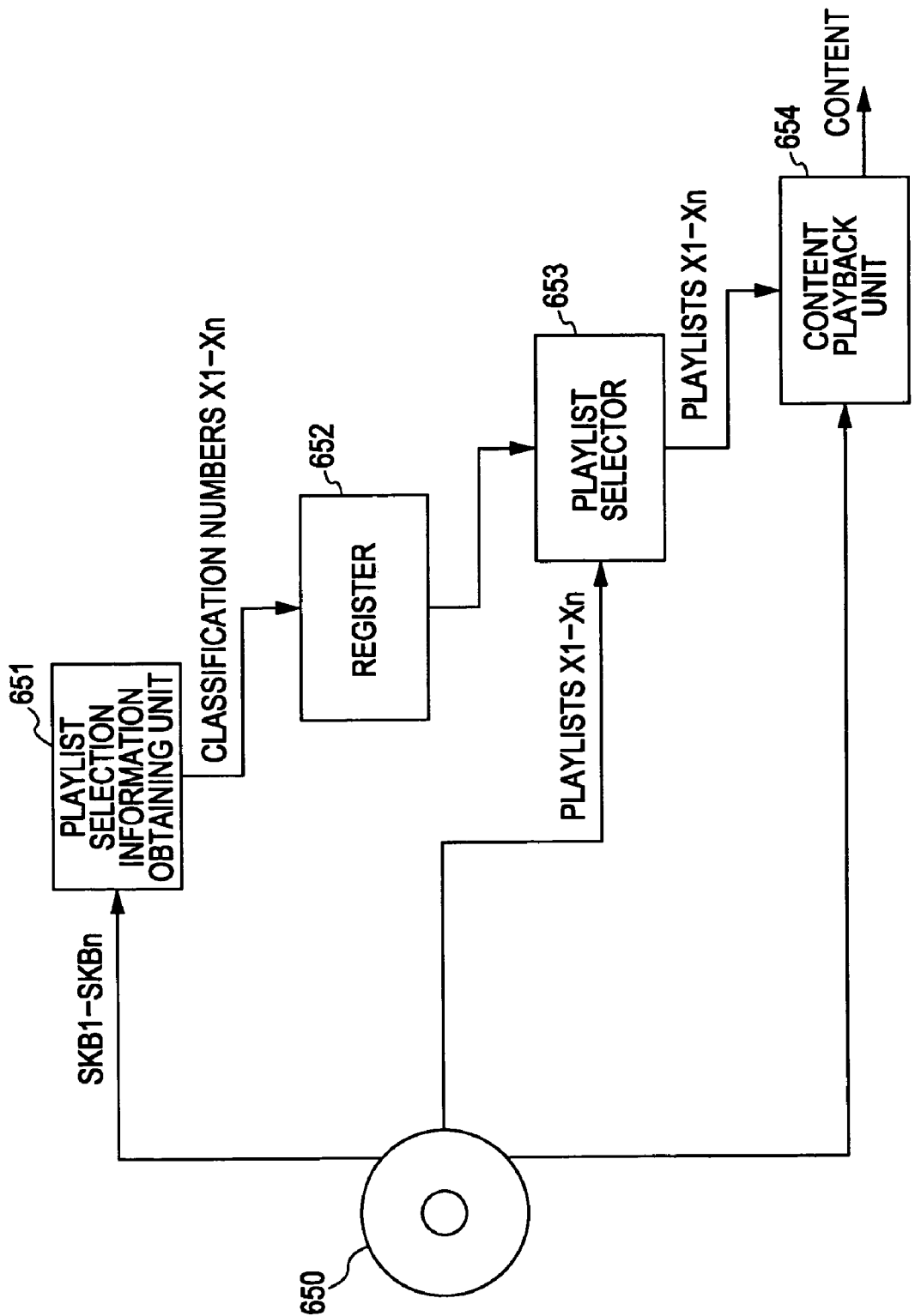
FIG. 21 is a functional block diagram illustrating an information processing apparatus that plays back content by setting classification numbers obtained from a plurality of SKBs in a register and by selecting and switching playlists on the basis of the classification numbers.

The functions of an information processing apparatus that executes the above-described processing is described below with reference to FIG. 21. FIG. 21 is a functional block diagram illustrating an information processing apparatus that implements seamless content playback processing by setting classification numbers in a register as playlist selection information and by efficiently switching a plurality of playlists by movie object command processing. The information processing apparatus includes a playlist selection information obtaining unit 651, a register 652, a playlist selector 653, and a content playback unit 654.

In an information recording medium 650, content including a plurality of divided playback zones to which playlists are assigned, such as the content discussed with reference to FIG. 3, is stored. The playlist selection information obtaining unit 651 obtains classification numbers (variant Nos.), which serve as playlist selection information, from the sequence key blocks (SKBs). The playlist includes information concerning a playback sequence of play items, which are set as content playback unit data. That is, the playlist selection information obtaining unit 651 obtains a plurality of classification numbers X1 through Xn from the plurality of SKBs.

The register 652 stores the plurality of playlist selection information, i.e., classification numbers, obtained by the playlist selection information obtaining unit 651, as shown in FIG. 18. The playlist selector 653 sequentially obtains the classification numbers stored in the register 652, and selects the playlists on the basis of the classification numbers. The content playback unit 654 plays back content on the basis of the playlists selected by the playlist selector 653.

The playlist selection information obtaining unit 651 selects, from each SKB in accordance with the corresponding content playback zone, a classification number, which serves as playlist selection information concerning a playlist having a play item sequence defined by the playback path which contains variation data selected from each segment portion. The classification number can be obtained in accordance with the SKB processing discussed with reference to FIG. 9 by using the media key (Km) obtained from the MKB and the sequence key SK(c, r).

The playlist selector 653 sequentially obtains the plurality of playlist selection information stored in the register 652 on the basis of the commands, such as those shown in FIG. 19A, of a movie object, which is set as a playback processing program, and selects playlists based on the selection information obtained from the register 652.

6. Example of Configuration of Information Processing Apparatus

Figure 22:
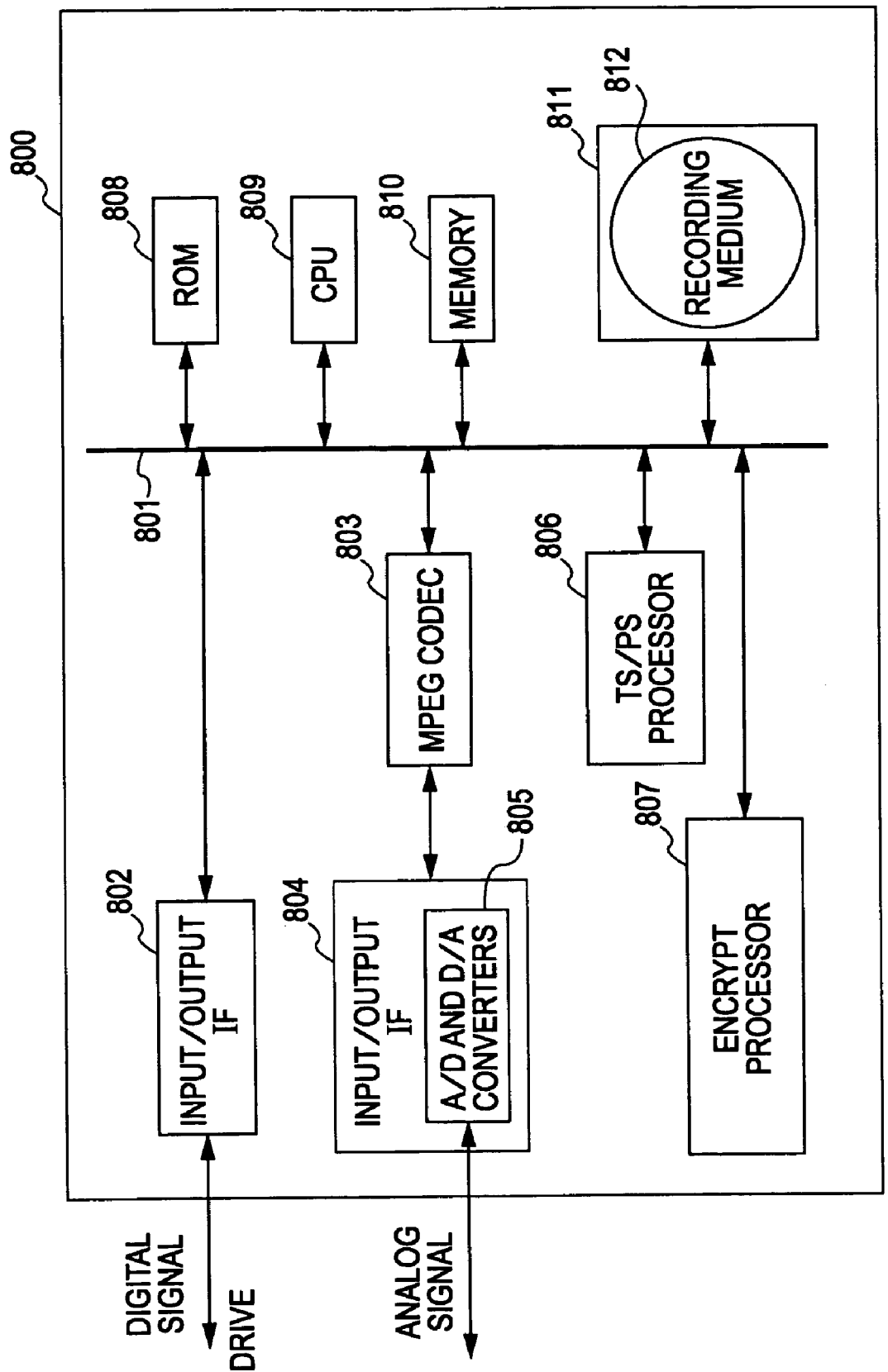
FIG. 22 illustrates an example of the configuration of an information processing apparatus that plays back content from an information recording medium.

An example of the hardware configuration of an information processing apparatus that executes the above-described content playback processing is described below with reference to FIG. 22.

An information processing apparatus 800 includes a central processing unit (CPU) 809 for executing data processing according to various programs, such as an operating system (OS) and a content recording/playback application program, a ROM 808, which serves as a storage area, for storing programs and parameters, a memory 810, an input/output interface (IF) 802 for inputting and outputting digital signals, an input/output interface (IF) 804 for inputting and outputting analog signals and including analog-to-digital (A/D) and digital-to-analog (D/A) converters 805, an MPEG codec 803 for encoding and decoding MPEG data, a transport-stream (TS)/program-stream (PS) processor 806 for executing TS/PS processing, an encryption processor 807 for executing various encrypt processing operations accompanied by MKB processing, SKB processing, generating various cryptographic keys, encryption and decryption processing, and decryption processing on encrypted content, a recording medium 812, such as a hard disk, and a drive 811 for driving the recording medium 812 and for inputting and outputting of data recording/playback signals. The above-described blocks are connected to a bus 801.

The information processing apparatus (host) 800 is connected to a drive by a connection bus, such as Advanced Technology Attachment Packet Interface BUS (ATAPI)-BUS, for inputting and outputting MKB, SKB, content, etc. via the digital-signal input/output IF 802. The MKB processing, SKB processing, encryption processing, decryption processing, and content playback processing are executed by the CPU 809 and the encryption processor 807 in accordance with the processing sequences discussed with reference to the above-described flowcharts and sequence diagrams. In executing those processing operations, various computation operations defined by the programs, and various algorithms, such as AES algorithms, are employed.

The program for executing the playback or recording processing is stored in the ROM 808, and while executing the program, the memory 810 is used as a storage area for parameters and data or as a work area if necessary.

In the ROM 808 or the recording medium 812, the device key (Kd) used for MKB processing and the sequence key file used for SKB processing, can be stored.

When playing back content and outputting it, for example, playlist integrating processing discussed with reference to the flowchart in FIG. 16 may be used for playing back the content. Alternatively, the processing discussed with reference to the flowchart in FIG. 20 may be used, and classification numbers obtained form SKBs are preset in a register, and playlists corresponding to the classification numbers are sequentially obtained by using movie object commands. With this processing, seamless playback processing can be performed on content playback zones associated with a plurality of playlists.

The series of processing operations described in the specification may be executed by hardware or software or a combination thereof. If software is used, a program recording a processing sequence therein can be installed into a memory of a computer built in dedicated hardware or a general-purpose computer that can execute various processing operations.

The program may be prerecorded in a hard disk or a ROM as a recording medium. Alternatively, the program may be temporarily or permanently stored (recorded) in a removable recording medium, such as a flexible disk, a compact disc read only memory (CD-ROM), a magneto-optical (MO) disk, a DVD, a magnetic disk, or a semiconductor memory. Such a removable recording medium can be provided as so-called "package software".

The program may be installed into a computer from the above-described removable recording medium. Alternatively, the program may be wirelessly transferred from a download site into a computer or transferred into a computer by wired means via a network, such as a local area network (LAN) or the Internet, and the computer can receive the transferred program and install it in a recording medium, such as a built-in hard disk.

The various processing operations discussed in the specification may be executed in chronological order as described in the specification. Alternatively, the processing operations may be executed in parallel or individually in accordance with the processing performance of an apparatus executing the processing operations or according to the necessity. In this specification, the system is a logical set of a plurality of apparatuses, and it is not necessary that the apparatuses be in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus that plays back content including a plurality of divided playback zones, a playlist being associated with each of the divided playback zones, comprising:

a playlist selection information obtaining unit configured to obtain a plurality of pieces of playlist selection information including information concerning a playback sequence of play items which are set as content playback unit data, the plurality of pieces of playlist selection information being obtained in accordance with the number of playback zones included in the content;

a playlist selector configured to select a plurality of playlists on the basis of the plurality of pieces of playlist selection information obtained by the playlist selection information obtaining unit;

a playlist integrating processor configured to generate an integrated playlist by integrating the plurality of playlists selected by the playlist selector; and a content playback unit configured to play back the content on the basis of the integrated playlist.

2. The information processing apparatus according to claim 1, wherein the content is recorded on an information recording medium and includes segments portions, each having a plurality of variation data generated by encrypting an identical playback data portion with different cryptographic keys, and the playlist selection information obtaining unit selects, in accordance with each of the content playback zones, playlist selection information corresponding to a playlist including a play item sequence that is defined by a playback path having variation data selected from each segment portion, the playback path being selected in accordance with the information processing apparatus.

3. The information processing apparatus according to claim 1, wherein the playlist selection information obtaining unit processes a plurality of sequence key blocks, each storing the playlist selection information corresponding to each of the playback zones, by executing data processing on the basis of a cryptographic key stored in the information processing apparatus, thereby obtaining the playlist selection information from each of the plurality of sequence key blocks.

4. The information processing apparatus according to claim 1, wherein the playlist integrating processor generates the integrated playlist in which the information concerning the playback sequences of the play items included in the plurality of playlists is set as one play item sequence.

5. The information processing apparatus according to claim 1, wherein the content playback unit plays back the content by using a virtual file system that is accessible from the integrated playlist generated by the playlist integrating processor and by obtaining the play items specified in the integrated playlist.

6. An information processing apparatus that plays back content including a plurality of divided playback zones, a playlist being associated with each of the divided playback zones, comprising:

a playlist selection information obtaining unit configured to obtain a plurality of pieces of playlist selection information including information concerning a playback sequence of play items which are set as content playback unit data, the plurality of pieces of playlist selection information being obtained in accordance with the number of playback zones included in the content;

a register configured to store the plurality of pieces of playlist selection information obtained by the playlist selection information obtaining unit;

a playlist selector configured to sequentially obtain the plurality of pieces of playlist selection information stored in the register and to select playlists on the basis of the plurality of pieces of playlist selection information; and a content playback unit configured to play back the content on the basis of the playlists selected by the playlist selector.

7. The information processing apparatus according to claim 6, wherein the content is recorded on an information recording medium and includes segments portions, each having a plurality of variation data generated by encrypting an identical playback data portion with different cryptographic keys, and the playlist selection information obtaining unit selects, in accordance with each of the content playback zones, playlist selection information corresponding to a playlist including a play item sequence that is defined by a playback path having variation data selected from each segment portion, the playback path being selected in accordance with the information processing apparatus.

8. The information processing apparatus according to claim 6, wherein the playlist selection information obtaining unit processes a plurality of sequence key blocks, each storing the playlist selection information corresponding to each of the playback zones, by executing data processing on the basis of a cryptographic key stored in the information processing apparatus, thereby obtaining the playlist selection information from each of the plurality of sequence key blocks.

9. The information processing apparatus according to claim 6, wherein the playlist selector sequentially obtains the plurality of pieces of playlist selection information stored in the register to select the playlists on the basis of the plurality of pieces of playlist selection information in accordance with commands of a movie object which is set as a playback processing program.

10. An information processing method for playing back content including a plurality of divided playback zones, a playlist being associated with each of the divided playback zones, comprising the steps of:

obtaining a plurality of pieces of playlist selection information including information concerning a playback sequence of play items which are set as content playback unit data, the plurality of pieces of playlist selection information being obtained in accordance with the number of playback zones included in the content;

selecting a plurality of playlists on the basis of the obtained plurality of pieces of playlist selection information;

generating an integrated playlist by integrating the selected plurality of playlists; and playing back the content on the basis of the integrated playlist.

11. The information processing method according to claim 10, wherein the content is recorded on an information recording medium and includes segments portions, each having a plurality of variation data generated by encrypting an identical playback data portion with different cryptographic keys, and when selecting the playlist selection information, playlist selection information corresponding to a playlist including a play item sequence that is defined by a playback path having variation data selected from each segment portion is selected in accordance with each of the content playback zones, the playback path being selected in accordance with an information processing apparatus.

12. The information processing method according to claim 10, wherein, when selecting the playlist selection information, a plurality of sequence key blocks, each storing the playlist selection information corresponding to each of the playback zones, are processed by executing data processing on the basis of a cryptographic key stored in an information processing apparatus so that the playlist selection information is obtained from each of the plurality of sequence key blocks.

13. The information processing method according to claim 10, wherein, when generating the integrated playlist, an integrated playlist in which the information concerning the playback sequences of the play items included in the plurality of playlists is set as one play item sequence is generated.

14. The information processing method according to claim 10, wherein the content is played back by using a virtual file system that is accessible from the generated integrated playlist and by obtaining the play items specified in the integrated playlist.

15. An information processing method for playing back content including a plurality of divided playback zones, a playlist being associated with each of the divided playback zones, comprising the steps of:
obtaining a plurality of pieces of playlist selection information including information concerning a playback sequence of play items which are set as content playback unit data, the plurality of pieces of playlist selection information being obtained in accordance with the number of playback zones included in the content;
storing the obtained plurality of pieces of playlist selection information in a register;
sequentially obtaining the plurality of pieces of playlist selection information stored in the register to select playlists on the basis of the plurality of pieces of playlist selection information; and
playing back the content on the basis of the selected playlists.

16. The information processing method according to claim 15, wherein the content is recorded on an information recording medium and includes segments portions, each having a plurality of variation data generated by encrypting an identical playback data portion with different cryptographic keys, and
when selecting the playlist selection information, playlist selection information corresponding to a playlist including a play item sequence that is defined by a playback path having variation data selected from each segment portion is selected in accordance with each of the content playback zones, the playback path being selected in accordance with an information processing apparatus.

17. The information processing method according to claim 15, wherein, when selecting the playlist selection information, a plurality of sequence key blocks, each storing the playlist selection information corresponding to each of the playback zones, are processed by executing data processing on the basis of a cryptographic key stored in an information processing apparatus so that the playlist selection information is obtained from each of the plurality of sequence key blocks.

18. The information processing method according to claim 15, wherein, when selecting the playlists, the plurality of pieces of playlist selection information stored in the register are sequentially obtained so that the playlists are selected on the basis of the plurality of pieces of playlist selection information in accordance with commands of a movie object which is set as a playback processing program.

19. A non-transitory information recording medium comprising:
content including a plurality of divided playback zones, each divided playback zone including segment portions having a plurality of variation data generated by encrypting an identical playback data portion with different cryptographic keys; and
a plurality of playlist selection information storage blocks, each being set in association with the corresponding playback zone, the content and the plurality of playlist selection information storage blocks being stored in the information recording medium,
wherein each of the plurality of playlist selection information storage blocks stores a plurality of different pieces of playlist selection information corresponding to different playback paths, the playback path being determined in accordance with an information processing apparatus that plays back the content.

20. The information recording medium according to claim 19, wherein each of the plurality of playlist selection information storage blocks stores a plurality of different pieces of playlist selection information corresponding to each content playback zone, and the plurality of different pieces of playlist selection information correspond to a plurality of different playlists including play item sequences that are defined by a plurality of different playback paths having variations data selected from each segment portion, the playback path being selected in accordance with the information processing apparatus that plays back the content stored in the information recording medium.

21. The information recording medium according to claim 19, wherein each of the plurality of playlist selection information storage blocks obtains playlist selection information corresponding to a playlist defined by a playback path having variation data selected from each segment portion by executing data processing on the basis of a cryptographic key stored in the information processing apparatus that plays back the content stored in the information recording medium, the playback path being selected in accordance with the information processing apparatus.

22. The information recording medium according to claim 19, wherein each of the plurality of playlist selection information storage blocks includes cryptographic generation information used for decrypting data forming the content located on the playback path including variation data selected from each segment portion, the playback path being selected in accordance with the information processing apparatus that plays back the content stored in the information recording medium.

* * * * *